(12) United States Patent
Yoshimura et al.

(10) Patent No.: US 11,615,632 B2
(45) Date of Patent: Mar. 28, 2023

(54) ABNORMALITY DETECTION DEVICE AND ABNORMALITY DETECTION PROGRAM

(71) Applicant: DENSO CORPORATION, Kariya (JP)

(72) Inventors: Yukiyasu Yoshimura, Kariya (JP); Hiroshi Morimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 22 days.

(21) Appl. No.: 16/891,532

(22) Filed: Jun. 3, 2020

(65) Prior Publication Data
US 2020/0293800 A1 Sep. 17, 2020

Related U.S. Application Data

(63) Continuation of application No. PCT/JP2018/042780, filed on Nov. 20, 2018.

(30) Foreign Application Priority Data

Dec. 8, 2017 (JP) .............................. JP2017-236224

(51) Int. Cl.
*G06K 9/00* (2022.01)
*G06V 20/59* (2022.01)
*B60W 40/08* (2012.01)
*G08G 1/16* (2006.01)
(Continued)

(52) U.S. Cl.
CPC ........... *G06V 20/597* (2022.01); *B60W 40/08* (2013.01); *G06V 10/25* (2022.01); *G06V 40/10* (2022.01); *G08G 1/16* (2013.01); *B60W 2420/42* (2013.01); *B60W 2540/223* (2020.02)

(58) Field of Classification Search
CPC ........... G06K 9/00845; G06K 9/00362; G06K 9/3233; G06K 9/00228; B60W 40/08; B60W 2540/223; B60W 2420/42; B60W 2520/10; B60W 2040/0818; G08G 1/16; B60K 28/06; G06T 7/00
See application file for complete search history.

(56) References Cited

U.S. PATENT DOCUMENTS

| | | | |
|---|---|---|---|
| 6,049,747 A | 4/2000 | Nakajima et al. | |
| 2003/0079929 A1* | 5/2003 | Takagi | B60R 21/01542 180/274 |

(Continued)

FOREIGN PATENT DOCUMENTS

| | | |
|---|---|---|
| JP | H10-960 A | 1/1998 |
| JP | 2005108033 A | 4/2005 |

(Continued)

*Primary Examiner* — Dhaval V Patel
(74) *Attorney, Agent, or Firm* — Harness, Dickey & Pierce, P.L.C.

(57) ABSTRACT

An abnormality detection device is provided to detect an abnormal posture of a driver of a vehicle based on information of an image captured by an imaging unit for which an imaging region is defined to image a head of the driver. The abnormality detection device is configured to define at least one premonition region in a range in which the head is supposed to be positioned in process of transitioning from a normal posture to the abnormal posture in the imaging region. When the head stays in a premonition region, the abnormality detection device determines that the driver is in a state of the abnormal posture.

9 Claims, 17 Drawing Sheets

(51) Int. Cl.
     *G06V 10/25*     (2022.01)
     *G06V 40/10*     (2022.01)

(56) References Cited

U.S. PATENT DOCUMENTS

| | | | |
|---|---|---|---|
| 2016/0114806 A1* | 4/2016 | Ao | B60Q 9/00 |
| | | | 348/148 |
| 2017/0161576 A1* | 6/2017 | Banno | G06T 7/292 |
| 2018/0197030 A1 | 7/2018 | Yamataka et al. | |
| 2018/0232588 A1* | 8/2018 | Matsumura | B60Q 9/00 |

FOREIGN PATENT DOCUMENTS

| | | | | |
|---|---|---|---|---|
| JP | 2010044493 | A | 2/2010 | |
| JP | 2016027452 | A | 2/2016 | |
| JP | 2016139192 | A | 8/2016 | |
| JP | 2017016568 | A | 1/2017 | |
| WO | WO-2015198541 A1 * | | 12/2015 | B60K 28/066 |

* cited by examiner

<FORWARD-FALLING STATE>

<SLIP-DOWN STATE>

<SUPINE STATE>

FIG. 8

| | | DRIVER STATUS | | |
|---|---|---|---|---|
| | | NORMAL | PREMONITION | ABNORMAL |
| START ACTIVITY | | — | — | — |
| COND | ELAPSE OF TIME T2 | — | ABNORMAL | — |
| | "OUT OF PREMONITION REGION" + "EXC-COND MET" ≥ P2 | — | NORMAL | NORMAL |
| | | — | COUNTER CLR | COUNTER CLR |
| | "IN PREMONITION REGION" ≥ P1 | PREMONITION | — | — |
| | | COUNTER CLR | — | — |
| END ACTIVITY | | — | COUNTER INCR* | — |

| TRNS. DEST |
|---|
| ACTION |

*DO COUNTER INCR EVEN IN UNDETECTION

|  | TIME → |
|---|---|
| ACTUAL POSTURE (TRUE VAL) | ORDINARY \| FORWARD-FALLING \| ORDINARY |
| SPEED | 20km/h |
| FACE POSITION (z-AXIS) | 40mm ＼ 20mm |
| FACE POSITION (y-AXIS) | 40mm ＼ 20mm |
| DET BUFFER | ①②③④⑤⑥⑦　　　⑧⑨⑩⑪ |
| DRIVER STATUS (DET RESULT) | NORMAL |

: OUT OF PREMONITION REGION
: IN PREMONITION REGION
: UNDETECTABLE
: EXC-COND MET

ABNORMALITY DETECTION DEVICE AND ABNORMALITY DETECTION PROGRAM

CROSS REFERENCE TO RELATED APPLICATIONS

This application is a continuation application of PCT/JP2018/042780 filed on Nov. 20, 2018, which designated the U.S. and claims the benefit of priority from Japanese Patent Application No. 2017-236224 filed on Dec. 8, 2017. The entire disclosures of all of the above applications are incorporated herein by reference.

TECHNICAL FIELD

The present disclosure relates to a technology for detecting transition of a driver of a vehicle to an abnormal posture.

BACKGROUND

There is a driving-incapable state detection device for determining an abnormal posture of a driver of a vehicle based on information on an image captured by a driver camera mounted to the vehicle.

SUMMARY

In an aspect of the present disclosure, an abnormality detection device is provided to detect an abnormal posture of a driver of a vehicle based on information of an image captured by an imaging unit in the vehicle in which an imaging region of the imaging unit is defined to image a head of the driver. The abnormality detection device is configured to define at least one premonition region in a range in which the head is supposed to be positioned in process of transitioning from a normal posture to the abnormal posture in the imaging region. The abnormality detection device is configured to determine that the driver is in a state of the abnormal posture when the head stays in the premonition region.

In another aspect of the present disclosure, an abnormality detection program is provided to detect an abnormal posture of a driver of a vehicle based on information of an image captured by an imaging unit in the vehicle in which an imaging region of the imaging unit is defined to image a head of the driver. The abnormality detection program causes at least one processing unit to function as: defining at least one premonition region in a range in which the head is supposed to be positioned in process of transitioning from a normal posture to the abnormal posture; and determining that the driver is in a state of the abnormal posture when the head stays in the premonition region.

BRIEF DESCRIPTION OF DRAWINGS

FIG. 8 is a state transition table illustrating driver's state transition.

DETAILED DESCRIPTION

Figure 1:
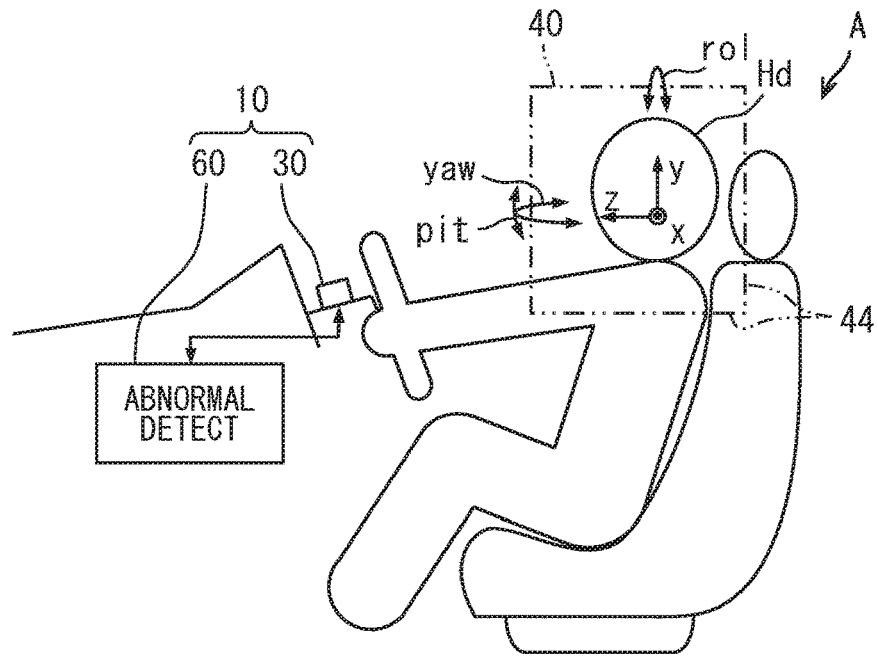
FIG. 1 is a diagram schematically illustrating an overview of a status monitor system.

There is a driving-incapable state detection device for determining an abnormal posture of a driver based on information on an image captured by a driver camera mounted to a vehicle. The driving-incapable state detection device determines that the driver is in a driving-incapable state when, due to posture collapse of the driver having an abnormality, a head of the driver is framed out of an imaging region of the driver camera.

In the driving-incapable state detection device, the driving-incapable state of the driver is determined based on only information of the vicinity of a boundary of the imaging region or outside the imaging region. The accuracy of the information in the vicinity of the boundary of the imaging region or outside the boundary of the imaging region is in natural likely to be deteriorated more than the accuracy of the information in the imaging region. Therefore, in the determination based on the frame-out of the head, it is difficult to improve the determination accuracy for the posture collapse of the driver.

It is an object of the present disclosure to provide an abnormality detection device and an abnormality detection program capable of improving accuracy of determination of driver's posture collapse.

In an aspect of the present disclosure, an abnormality detection device is detects an abnormal posture of a driver based on information of an image captured by an imaging unit in a vehicle equipped with the imaging unit for which an imaging region is defined to image a head of the driver. The abnormality detection device comprises: a region definition unit that defines at least one premonition region in a range in which the head is supposed to be positioned in process of transitioning from a normal posture to the abnormal posture in the imaging region; and a posture determination unit that determines that the driver is in a state of the abnormal posture when the head stays in the premonition region.

In another aspect of the present disclosure, an abnormality detection program detects an abnormal posture of a driver based on information of an image captured by an imaging unit in a vehicle having the imaging unit in which an imaging region is defined to image a head of the driver. The abnormality detection program causes at least one processing unit to function as: a region definition unit that, in the imaging region, defines at least one premonition region in a range in which the head is supposed to be positioned in process of transitioning from a normal posture to the abnormal posture; and a posture determination unit that determines that the driver is in a state of the abnormal posture when the head stays in the premonition region.

In such configurations, the premonition region is defined in a range in which the driver's head is supposed to be positioned in process of transitioning from the normal posture to the abnormal posture. When the head stays in the premonition region, it is determined that the posture is abnormal. In this manner, the posture determination unit can use not only the information in vicinity of the boundary of the imaging region or outside of the imaging region but also the information of the premonition region defined in the imaging region to determine the abnormal posture. It is easier to ensure accuracy of the information of the premonition region than accuracy of the information in the vicinity of the boundary of the imaging region or outside the imaging region. Therefore, the determination of the abnormal posture by using the information of the premonition region can improve determination accuracy of the posture collapse of the driver.

Now, embodiments of the present disclosure will be specifically described with reference to the drawings.

Figure 2:
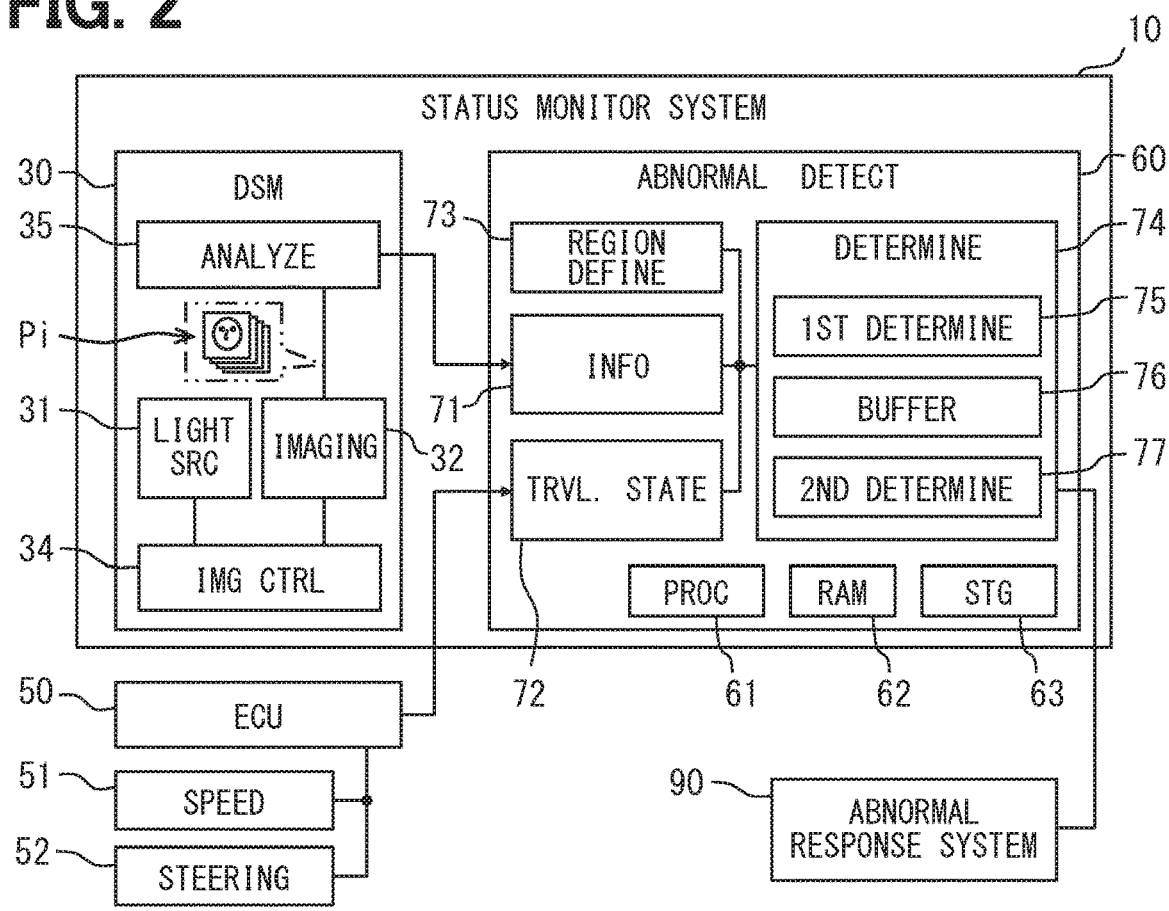
FIG. 2 is a block diagram illustrating an overall electrical configuration of the status monitor system.

A status monitor system 10 according to one embodiment of the present disclosure shown in FIGS. 1 and 2 is used in a vehicle A to monitor the state of a driver seated on a driver's seat of the vehicle A. The status monitor system 10 is mounted to a vehicle to operate a deceleration/stop type abnormality response system 90 mounted to the vehicle A. The abnormality response system 90 provides a lane departure prevention function and an off-road departure prevention function until the vehicle A is stopped. When the driver is in an abnormal state of a physical condition (so-called dead man) and hardly continues driving, the status monitor system 10 detects the posture collapse of the driver. Based on the dead man determination by the status monitor system 10, the abnormality response system 90 stops the vehicle A on behalf of the driver as an emergency measure.

The status monitor system 10 includes a DSM (Driver Status Monitor) 30, an abnormality detection device 60, and the like. The DSM 30 and the abnormality detection devices 60 are electrically connected directly or indirectly to each other and can communicate with each other.

The DSM 30 is installed on an upper surface of a steering column, a ceiling surface of a meter hood, or the like in a posture in which an imaging surface faces a driver's face. The DSM 30 includes a light source unit 31, an imaging unit 32, an imaging control unit 34, and an image analysis unit 35.

The light source unit 31 includes multiple light emitting diodes that emit a near-infrared light. The light source unit 31 emits a near-infrared light toward the vicinity of a headrest of the driver's seat. The imaging unit 32 includes an image pickup device, an optical system, and the like. An imaging region 40 of the imaging unit 32 is defined so as to capture a head Hd of the driver. The imaging region 40 is a three-dimensional rectangular parallelepiped-shaped space defined so as to include the head Hd of the driver in a posture suitable for driving in an anteroposterior direction (z-axis direction), a vertical direction (y-axis direction), and a width direction (x-axis direction) of the vehicle A. The imaging unit 32 captures an image of the head Hd of the driver irradiated with the near-infrared light by the light source unit 31 from a front side, and generates a face image Pi imaging the face of the driver. The imaging unit 32 continuously generates the face image Pi of the driver positioned in the imaging region 40 at a cycle of, for example, 30 frames per second, and sequentially outputs the captured face image Pi to the image analysis unit 35. An appropriate posture for driving is also referred to as a normal posture.

The imaging control unit 34 controls the light source unit 31 and the imaging unit 32. The imaging control unit 34 causes the light source unit 31 to emit the near-infrared light in accordance with an imaging timing of the imaging unit 32. The imaging control unit 34 adjusts a light emitting period of the light source unit 31, an aperture value of the imaging unit 32, an ISO sensitivity, a shutter speed, and the like in accordance with the brightness around the head Hd, for example, and controls imaging to obtain the face image Pi suitable for image analysis.

The image analysis unit 35 extracts the positions of a face contour, eyes, a nose, and the like from the individual face images Pi by image analysis of the face images Pi continuously captured. The image analysis unit 35 detects the three-dimensional position of the head Hd, a posture angle of the head Hd, and the like by use of the information extracted from each face image Pi. The image analysis unit 35 sequentially outputs coordinate information on the x-axis, y-axis, and z-axis indicating the three-dimensional position of the head Hd, and posture angle information such as a yaw angle, a roll angle, and a pitch angle indicating the posture angle, to the abnormality detection device 60. In addition, for example, when the head Hd moves out of the imaging region 40 or when the face is covered with a hand, cloth, or the like, the image analysis unit 35 outputs an output indicating that the detection is impossible (hereinafter, referred to as "undetectable information") to the abnormality detection device 60 instead of the coordinate information and the posture angle information.

Incidentally, in the coordinate information, an origin (0, 0, 0) of coordinates of the x-axis, the y-axis, and the z-axis is defined so as to overlap with a root portion of a neck of the driver who takes the normal posture, for example. In the posture angle information, the yaw angle is an angle around the y-axis, the roll angle is an angle around the z-axis, and the pitch angle is an angle around the x-axis. The yaw angle, the roll angle, and the pitch angle are each set to 0° when the head Hd faces the front without tilting with respect to a body and the face orientation is along a horizontal plane.

Figure 4:
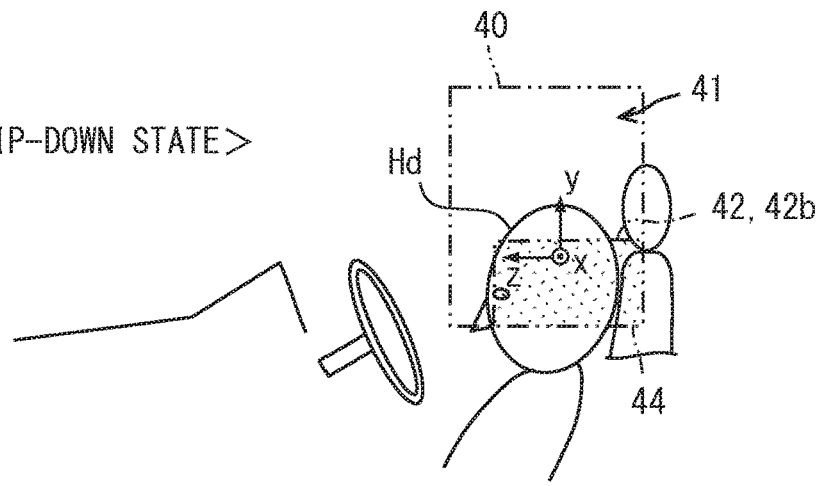
FIG. 4 is a diagram schematically illustrating a slip-down state, which is one of abnormal postures.
Figure 5:
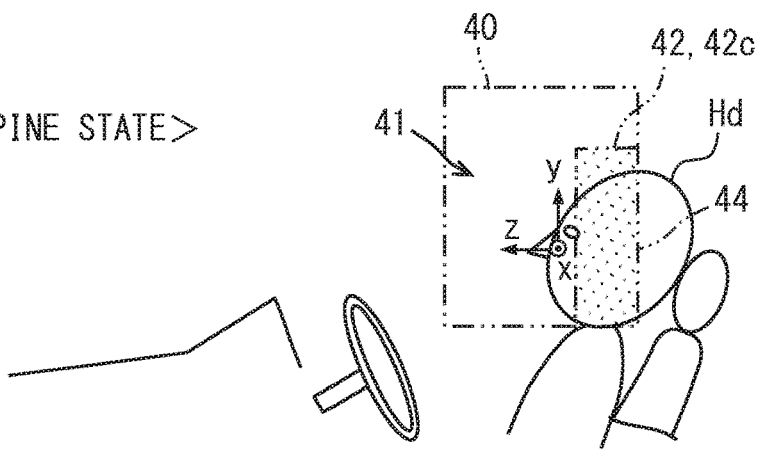
FIG. 5 is a diagram schematically illustrating a supine state, which is one of the abnormal postures.
Figure 6:
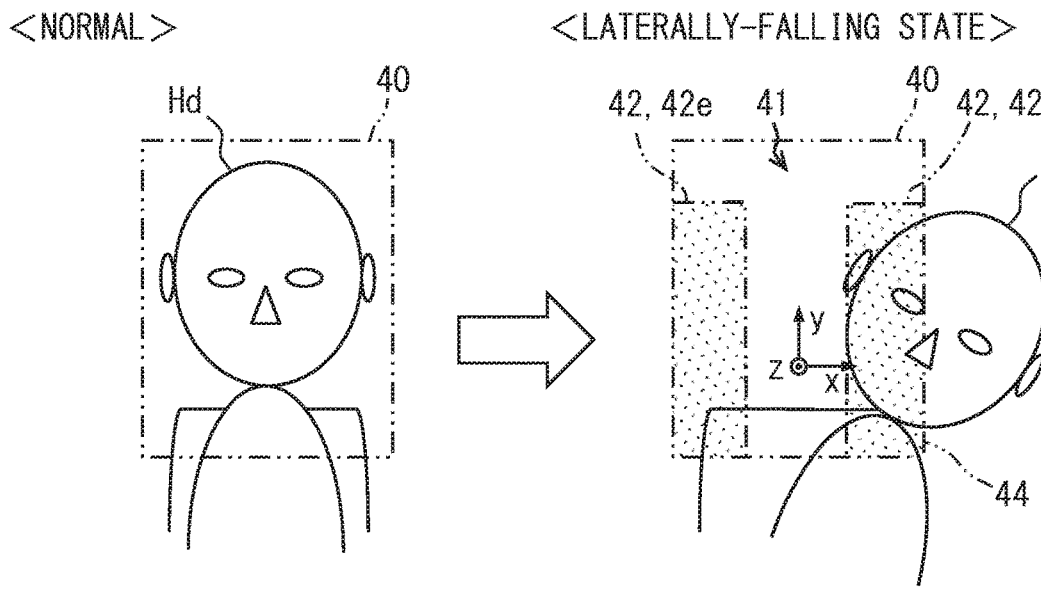
FIG. 6 is a diagram schematically illustrating a laterally-falling state, which is one of the abnormal postures.

The abnormality detection device 60 detects the abnormal posture of the driver in a dead-man state in which the posture collapses, based on the information of the face image Pi captured by the DSM 30. The abnormal posture detectable by the abnormality detection device 60 includes, for example, a forward-falling state (see FIG. 3), a slip-down state (see FIG. 4), a supine state (see FIG. 5), a laterally-falling state (see FIG. 6), and the like.

More specifically, the head Hd in the forward-falling state (see FIG. 3) moves forward and downward at a posture angle (pitch angle) downward from the normal posture (see FIG. 1). The head Hd in the slip-down state (see FIG. 4) moves downward from the normal posture. The head Hd in the supine state (see FIG. 5) moves backward and downward at a posture angle upward from the normal posture. The head Hd in the laterally-falling state (see FIG. 6) moves laterally downward at a posture angle that is more lateral than the normal posture.

The abnormality detection device 60 for detecting the abnormal posture is, for example, one of multiple electronic control units mounted to the vehicle A, and is mainly configured by a computer comprising a processing unit 61, a RAM 62, a storage unit 63, and an input/output interface. The processing unit 61 includes at least one of a CPU (Central Processing Unit), a GPU (Graphics Processing Unit), and an FPGA (Field-Programmable Gate Array). The storage unit 63 stores various programs to be executed by the processing unit 61. The multiple programs stored in the storage unit 63 include an abnormality detection program. The abnormality detection program is a program for detecting the abnormal posture of the driver to determine the posture collapse of the driver. The abnormality detection device 60 implements functional blocks including a driver information acquisition unit 71, a traveling state determination unit 72, a region definition unit 73, and a posture determination unit 74 by executing the abnormality detection program by the processing unit 61.

The driver information acquisition unit 71 acquires detection information related to a state of the driver. Specifically, the driver information acquisition unit 71 acquires the coordinate information, the posture angle information, the undetectable information, and the like from the DSM 30.

For example, the traveling state determination unit 72 acquires information related to the traveling state of the vehicle A from a vehicle integrated ECU (Electronic Control Unit) 50 mounted to the vehicle A. The vehicle integrated ECU 50 is electrically connected to, for example, a vehicle speed sensor 51 and a steering angle sensor 52. The traveling state determination unit 72 acquires vehicle speed information, steering angle information, and the like as information indicating the traveling state from the vehicle integrated ECU 50. The traveling state determination unit 72 determines whether or not the traveling state of the vehicle A corresponds to a pre-defined exclusion condition, based on the information acquired from the vehicle integrated ECU 50.

The exclusion condition is a condition for excluding a state of the driver who takes a posture different from a normal posture to check the safety of the surroundings, for example, in a scene traveling on a narrow street at a low speed, so as not to be determined as an abnormal posture. In other words, the exclusion condition is set so that a traveling scene on a narrow street such as turning right and left at a low speed can be indirectly estimated. For example, when a vehicle speed is 10 km/h or less, the traveling state determination unit 72 determines that the exclusion condition is met. Further, when a steering angle exceeds +60 deg. or is less than −60 deg., the traveling state determination unit 72 determines that the exclusion condition is met.

The region definition unit 73 defines at least one premonition region 42 (see FIGS. 3 to 6) in the imaging region 40. The premonition region 42 is defined in a range in which the head Hd of the driver is supposed to be positioned in process of transitioning from the normal posture to the abnormal posture in the imaging region 40. The premonition region 42 is a three-dimensional virtual space similar to the imaging region 40, includes at least one boundary surface 44 partitioning the imaging region 40, and is defined in a range having a predetermined width from the boundary surface 44 in the anteroposterior direction, the vertical direction, and the width direction. The region definition unit 73 can individually define the multiple premonition regions 42 corresponding to multiple types of abnormal postures to be detected by the abnormality detection device 60.

The premonition region 42 for a respective abnormal posture is defined in a space which the head is expected to pass through or go by way of, when transitioning from the normal posture to the respective abnormal posture. More specifically, a premonition region 42a corresponding to the forward-falling state (see dotted-range in FIG. 3) is defined as a rectangular parallelepiped shape that has a longer axis in the vertical direction and that is at a front lower portion of the entire imaging region 40. A premonition region 42b corresponding to the slip-down state (see a dot range in FIG. 4) is defined as a rectangular parallelepiped shape that has a longer axis in the anteroposterior direction and that is at a rear lower portion of the entire imaging region 40. A premonition region 42c corresponding to the supine state (see a dot range in FIG. 5) is defined as a rectangular parallelepiped shape that has a longer axis in the vertical direction and that is at a rear portion of the entire imaging region 40. Each of the premonition regions 42a to 42c described above is defined so as to cover, in the x-axis direction, a space between the left and right boundary surfaces 44 partitioning the imaging region 40.

In addition, a premonition region 42d (see a dot range in FIG. 6) corresponding to the leftward laterally-falling state is defined as a rectangular parallelepiped shape that has a longer axis in the vertical direction and that is at a lower left portion of the entire imaging region 40. In the same manner, a premonition region 42e corresponding to the rightward laterally-falling state (see a dot range in FIG. 6) is defined as a rectangular parallelepiped shape that has a longer axis in the vertical direction and that is at a lower right portion of the entire imaging region 40. Note that each of the premonition regions 42d and 42e is defined so as to extend in the z-axis direction between the front and rear boundary surfaces partitioning the imaging region 40.

The region definition unit 73 may be capable of adjusting the size and/or position of the premonition region 42 based on the position of the head Hd of the driver in the normal posture. In addition, the region definition unit 73 may adjust the position and size of the premonition region 42 in accordance with a driver's posture change that inevitably occurs during driving to reduce fatigue.

Figure 7:
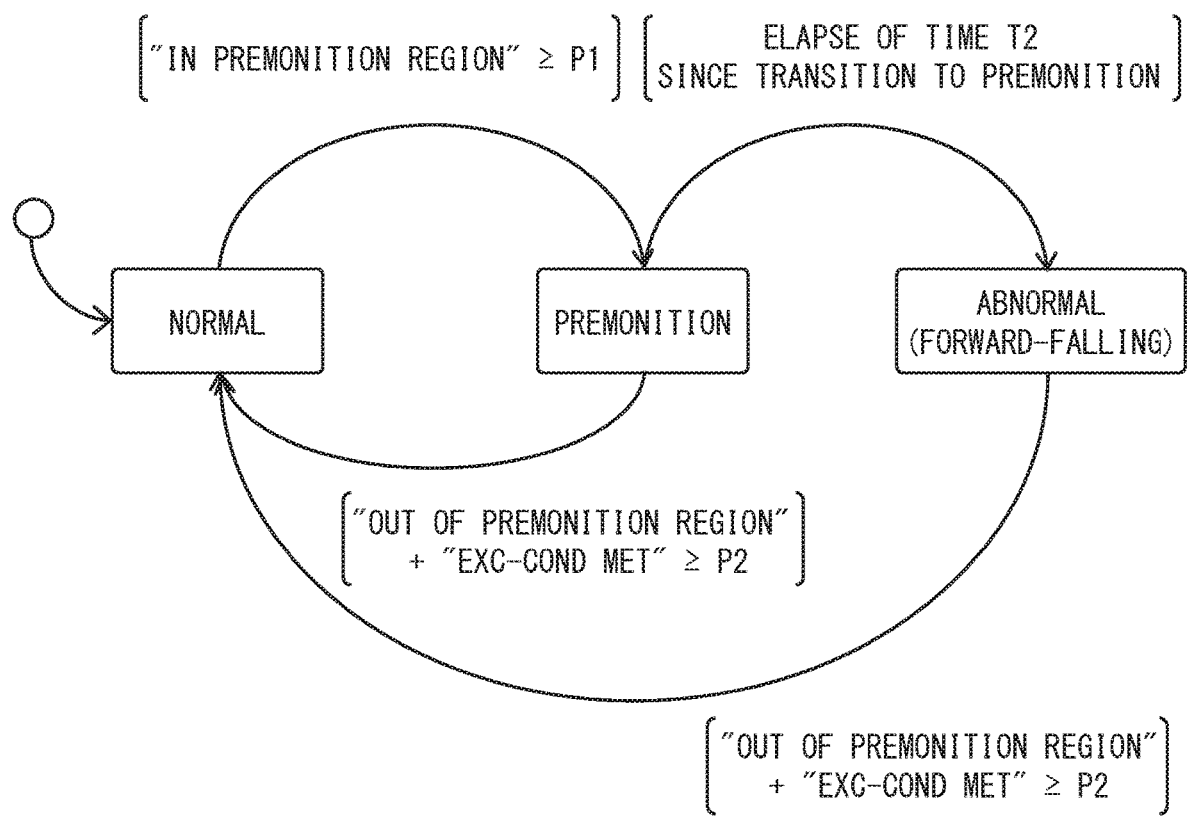
FIG. 7 is a state transition diagram illustrating an overview of driver(s state transition set in an abnormality detection device.

The posture determination unit 74 causes a determined state of the driver to transition among the normal posture, a premonition state, and the abnormal posture (see FIGS. 7 and 8). A logic of the state transition is set so that the premonition state is passed through when the normal posture transitions to the abnormal posture. In other words, a direct state transition from the normal posture to the abnormal posture is not performed. In response to startup of the abnormality detection device 60, the posture determination unit 74 sets the state of the driver to the normal posture as an initial value. When the head Hd of the driver stays in the premonition region 42, in other words, when the head Hd stays in the premonition region 42 for a predetermined period of time, the traveling state determination unit 72 causes the state of the driver given as a determination result to transition from the normal posture to the premonition state.

Further, when a predetermined time T2 (for example, 1.7 seconds) has elapsed without returning to the normal posture since the state of the driver transitioned to the premonition state, the posture determination unit 74 determines that the state of the driver given as the determination result is the abnormal posture. On the other hand, even after the transition to the premonition state or the abnormal posture, when the driver returns to the normal posture, the posture determination unit 74 causes the state of the driver to transition from the premonition state or the abnormal posture to the normal posture. In order to perform such state transition, the posture determination unit 74 is provided with sub-functional blocks including a first determination block 75, a determination buffer 76, and a second determination block 77.

The first determination block 75 controls the transition from the normal posture to the premonition state and the transition from the premonition state or the abnormal posture to the normal posture in cooperation with the determination buffer 76. The first determination block 75 repeats the determination of whether or not the head Hd is present in the premonition region 42 based on both the position and the posture angle of the head Hd, for example, in a constant cycle (for example, 30 times/second).

The determination buffer 76 has multiple storage areas (queues) for storing determination results as to whether or not the head Hd is present in the premonition region 42. The determination buffer 76 is provided with storage areas capable of consecutively storing determination results for a predetermined time T1 (for example, 0.66 seconds). The determination buffer 76 stores the predetermined number of determination results given by the first determination block 75 in time series. Specifically, any one of values indicating "in the premonition region", "out of the premonition region", "under the exclusion condition" and "undetectable" is stored in a respective storage area of the determination buffer 76. The determination buffer 76 discards the oldest value at the timing of storing the latest value in a first-in first-out process (First In, First Out, FIFO) of the determination result.

The first determination block 75 determines that the head Hd stays in the premonition region 42 based on a ratio of the number of "in the premonition region" to the total number of determination results stored in the determination buffer 76. More specifically, when the number of "in the premonition region" exceeds a predetermined ratio P1 (for example, 90%) of the total number of determination results, the first determination block 75 determines that the head Hd has stayed in the premonition region 42. As a result, the state transition from the normal posture to the premonition state is performed.

In addition, the first determination block 75 determines that the posture has returned to the normal posture based on the ratio of the total number of "out of the premonition region" and "under the exclusion condition" to the total number of determination results stored in the determination buffer 76. Specifically, when the total number of "out of the premonition region" and "under the exclusion condition" exceeds a predetermined ratio P2 (for example, 20%) of the total number stored in the first determination block 75, the first determination block 75 determines that the posture has returned to the normal posture. As a result, the state transition from the premonition state or the abnormal posture to the normal posture is performed.

The second determination block 77 controls the transition from the premonition state to the abnormal posture. The second determination block 77 has a counter function for measuring an elapsed time after the transition to the premonition state. The second determination block 77 measures the elapsed time after the state transition to the premonition state, that is, after the head Hd stays in the premonition region 42. More specifically, the second determination block 77 makes the state transition from the premonition state to the abnormal posture, when the elapsed time indicated by the counter exceeds a predetermined time T2 without return to a region included in the imaging region 40 except the premonition region 42 (hereinafter, referred to as "normal region 41", see FIG. 3). In the above, it is determined that the driver is in the abnormal posture.

Figure 9:
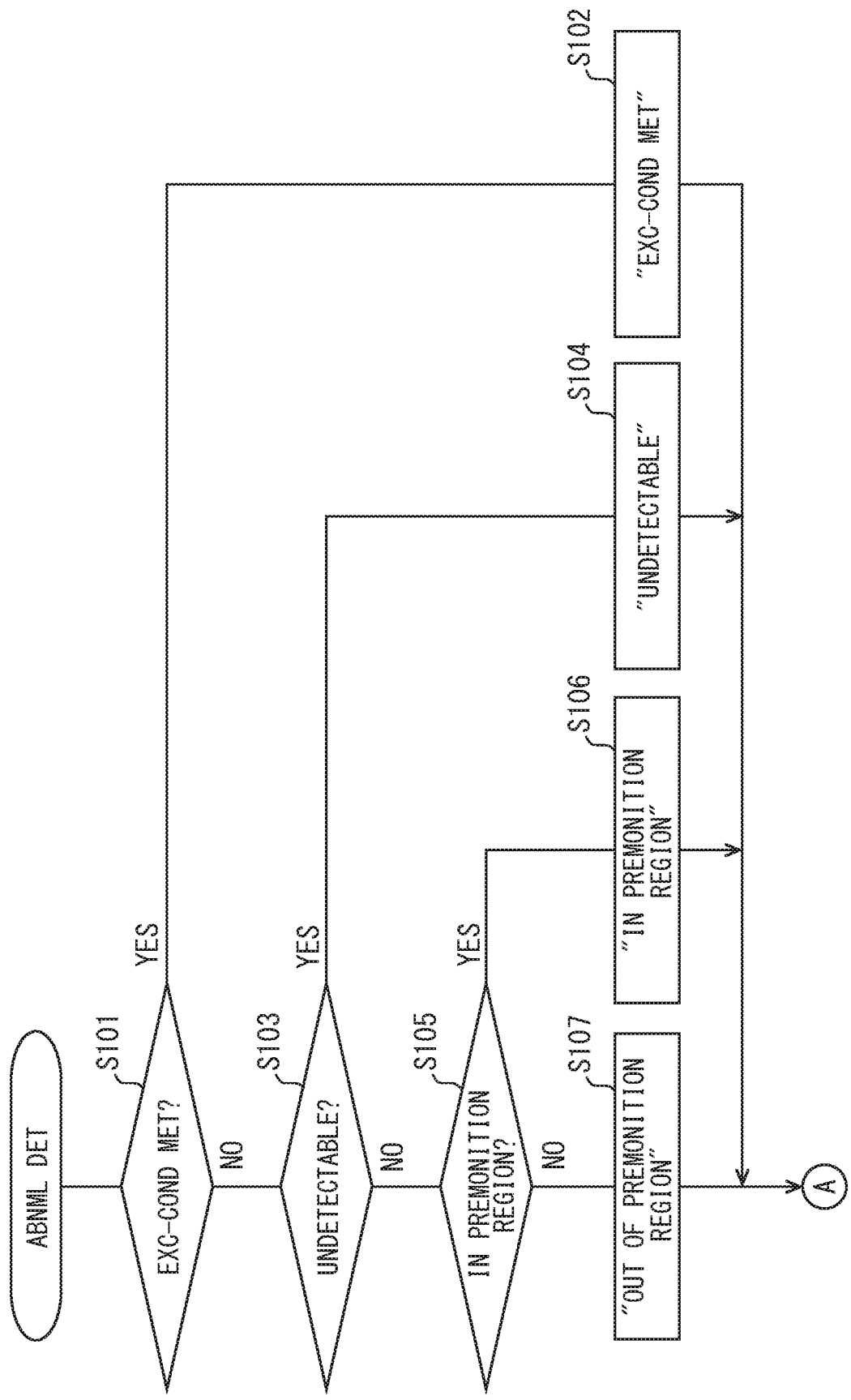
FIG. 9 is a flowchart illustrating details of an abnormal posture determination process in cooperation with FIG. 10.
Figure 10:
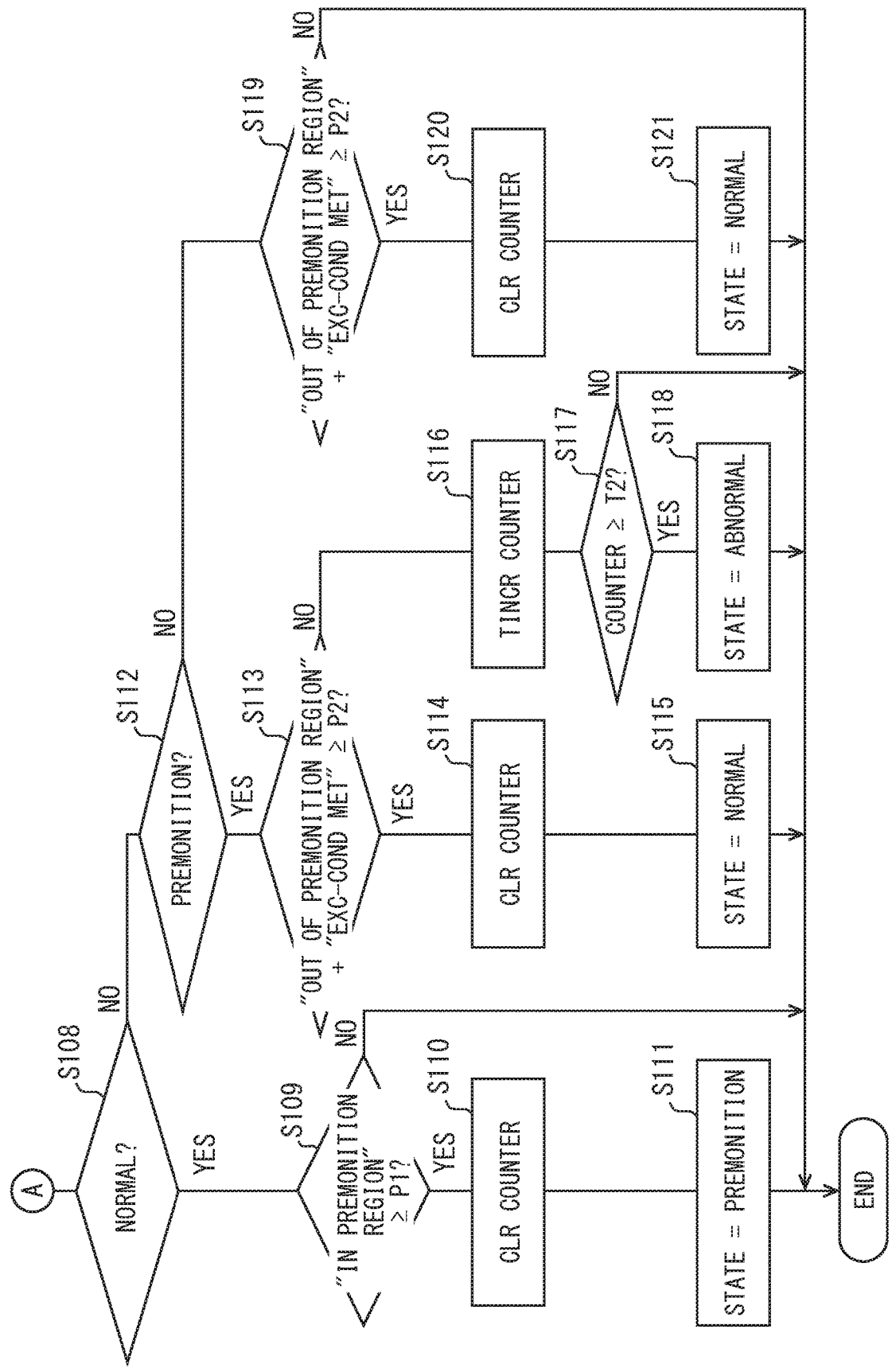
FIG. 10 is a flowchart illustrating details of the abnormal posture determination process in cooperation with FIG. 9.

Details of the abnormal posture determination process for implementing the state transition described above will be described based on FIGS. 9 and 10 with reference to FIGS. 2, 3, and 7. The abnormal posture determination process shown in FIG. 9 and FIG. 10 is started by the abnormality detection device 60 starts the abnormal posture determination process shown in FIG. 9 and FIG. 10, in response to switch on of an ignition of the vehicle A. The abnormality detection device 60 repeats the abnormal posture determination process until the ignition of the vehicle A is turned off. Note that one abnormal posture determination process may be a process for detecting one abnormal posture (for example, a forward-falling state). That is, the abnormality detection device 60 may perform a plurality of abnormal posture determination processes in parallel to each other by the number of abnormal postures to be detected.

In S101, it is determined whether or not the traveling state of the vehicle A corresponds to the exclusion condition. When the traveling state determination unit 72 determines that the exclusion condition is met, the process proceeds from S101 to S102. In S102, a value indicating "under exclusion condition" is stored in the latest value of the determination buffer 76, and the process proceeds to S108. When the exclusion condition is not satisfied in S101, the process proceeds to S103.

In S103, it is determined whether or not the undetectable information is acquired by the driver information acquisition unit 71. If it is determined in S103 that the head Hd is undetectable, the process proceeds to S104. In S104, a value indicating "undetectable" is stored in the latest value of the determination buffer 76, and the process proceeds to S108. When it is determined in S103 that the acquisition of the undetectable information is absent, the process proceeds to S105.

In S105, it is determined whether or not the head Hd is inside the premonition region 42 based on the coordinate information and the posture angle information provided to the driver information acquisition unit 71. As an example, when the coordinate information satisfies the anteroposterior direction z>25 mm and the vertical direction y>−25 mm, and the posture angle information satisfies the pitch angle ≤0 deg., it is determined that the head Hd is present in the premonition region 42 of the forward-falling state. If it is determined in S105 that the head Hd is inside the premonition region 42, the process proceeds to S106. In S106, a value indicating "in the premonition region" is stored in the latest value of the determination buffer 76, and the process proceeds to S108. On the other hand, when it is determined in S105 that the head Hd is within the normal region 41, the process proceeds to S107. In S107, a value indicating "out of the premonition region" is stored in the latest value of the determination buffer 76, and the process proceeds to S108. In S102, S104, S106 and S108, the oldest value stored in the determination buffer 76 is discarded.

In S108, it is determined whether or not the state of the driver determined by the posture determination unit 74 is "normal posture". When the state of the driver is "normal posture", the process proceeds from S108 to S109. In S109, it is determined whether or not the ratio of the values indicating "in the premonition region" in the determination buffer 76 within the predetermined period T1 is equal to or greater than the predetermined ratio P1. In S109, when the ratio of the values indicating "in the premonition region" is less than the predetermined ratio P1, the abnormal posture determination process is ended temporarily. On the other hand, when the ratio of the value indicating "in the premonition region" is equal to or larger than the predetermined ratio P1 in S109, the process proceeds to S110.

In S110, the value of the counter (hereinafter, referred to as "T2 counter") provided in the second determination block 77 is cleared, and the process proceeds to S111. In S111, the state of the driver is caused to transition from the "normal posture" to the "premonition state", and the abnormal posture determination process is ended temporarily.

When it is determined in S108 that the state of the driver is not the "normal posture", the process proceeds to S112. In S112, it is determined whether or not the transition state of the driver is the "premonition state". If the state of the driver is the "premonition state" in S112, the process proceeds to S113. In S113, it is determined whether or not the total number of the values indicating "out of the premonition region" and "under the exclusion condition" in the determination buffer 76 within the predetermined period T1 is equal to or greater than the predetermined ratio P2. In S113, when the total number of "out of the premonition region" and "under the exclusion condition" is equal to or larger than the predetermined ratio P2, the process proceeds to S114. In S114, the value of the T2 counter is cleared in the same manner as in S110, and the process proceeds to S115. In S115, the state of the driver transitions from the "premonition state" to the "normal posture", and the abnormal posture determination process is temporarily terminated.

If the total number of "out of the premonition region" and "under the exclusion condition" is less than the predetermined ratio P2 in S113, the process proceeds to S116. In S116, the value of the T2 counter is incremented, and the process proceeds to S117. In S117, it is determined whether or not the elapsed time indicated by the T2 counter is equal to or longer than a predetermined time T2. When it is determined in S117 that the elapsed time is less than the predetermined time T2, the abnormal posture determination process is ended temporarily. On the other hand, when it is determined in S117 that the predetermined time T2 or more has elapsed, the process proceeds to S118. In S118, the state of the driver transitions from the "premonition state" to the "abnormal posture", and the abnormal posture determination process is ended temporarily.

Further, when it is determined in S112 that the state of the driver is not the "premonition state", the process proceeds to S119. In S119, similarly to S113, it is determined whether or not the total number of the values indicating "out of the premonition region" and "under the exclusion condition" in the determination buffer 76 within the predetermined time T1 is equal to or greater than the predetermined ratio P2. In S119, when the total number of "out of the premonition region" and "under the exclusion condition" is equal to or larger than the predetermined ratio P2, the process proceeds to S120. In S120, the value of the T2 counter is cleared, and the process proceeds to S121. In S121, the state of the driver transitions from the "abnormal posture" to the "normal posture", and the abnormal posture determination process is ended temporarily. On the other hand, when the total number of the values indicating "out of the premonition region" and "under the exclusion condition" is less than the predetermined ratio P2 in S119, the abnormal posture determination process is ended temporarily.

With regard to the state transition of the driver by the abnormality determination process described above, specific examples will be described in order, based on use cases 1 to 8 shown in FIGS. 11 to 26 with reference to FIGS. 2 and 3. In the following description of examples, the driver's abnormal posture is the forward-falling state. The values of the predetermined times T1 and T2 and the predetermined ratios P1 and P2 are those illustrated above, that is, 0.66 sec, 1.7 sec, 90%, and 20%, respectively.

(Use Case 1)

Figure 11:
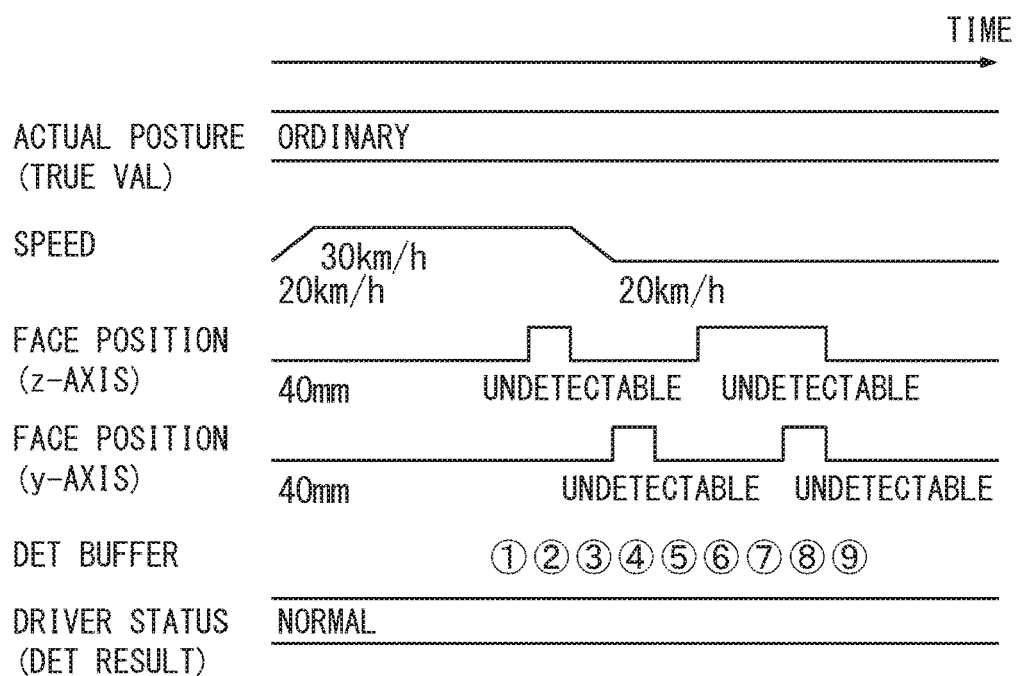
FIG. 11 is a diagram illustrating operation of the abnormality detection device in a use case 1.
Figure 12:
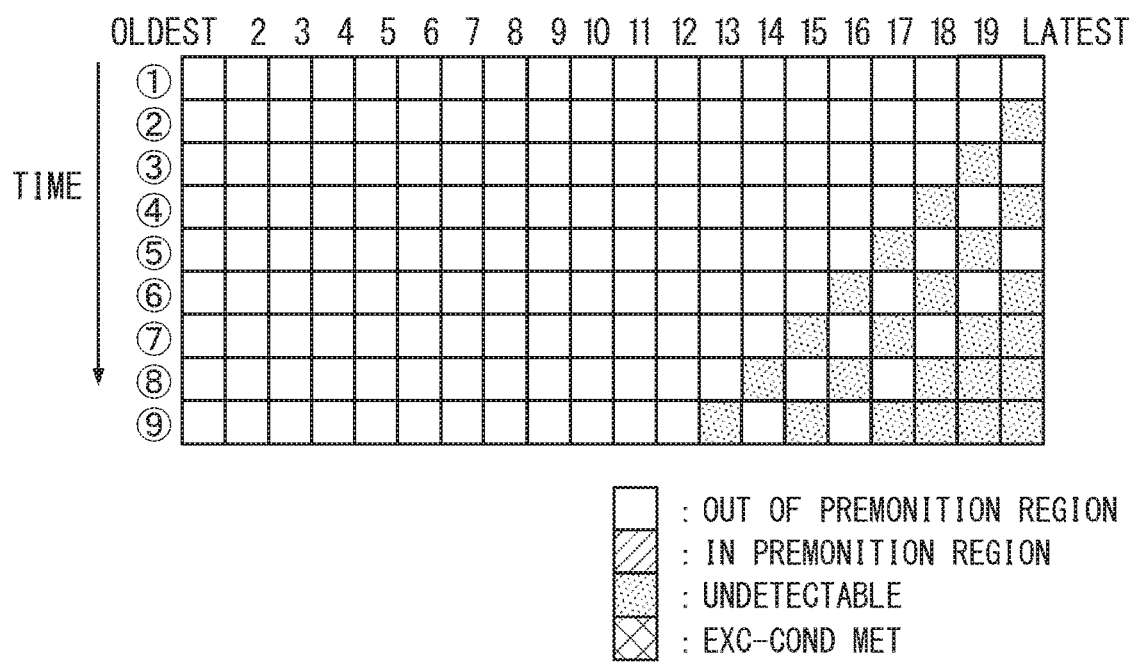
FIG. 12 is a diagram illustrating determination results stored in a determination buffer in the use case 1.

A use case 1 shown in FIGS. 11 and 12 is a case in which the posture of the driver is maintained in the normal state. In this case, the determination buffer 76 stores not only the determination result of "out of the premonition region" but also the determination result of "undetectable" due to an active action such as covering the face with a hand, noise generation or the like, for example. In the use case 1, since the normal posture of the driver is maintained, the ratio of the determination result indicating "in the premonition region" does not exceed the predetermined ratio P1 of the total number in the determination buffer 76. Therefore, the posture determination unit 74 continues to determine that the state of the driver is the "normal posture".

(Use Case 2)

Figures 13, 14:
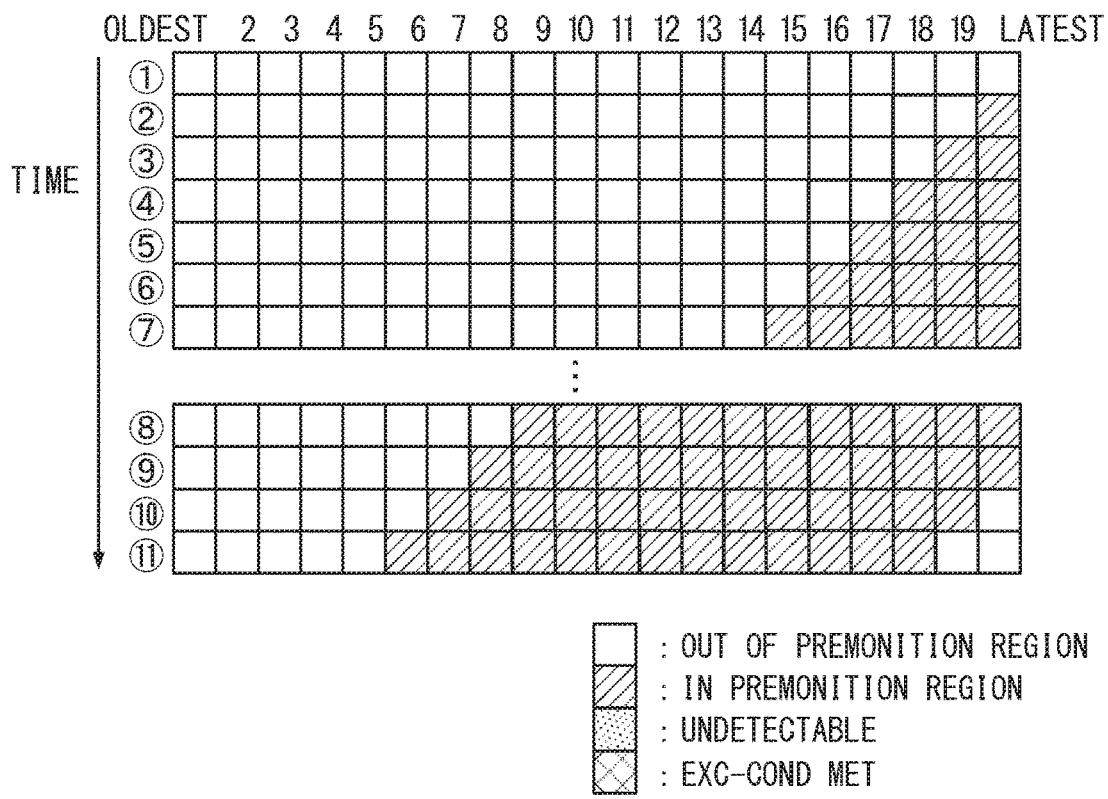
FIG. 13 is a diagram illustrating the operation of the abnormality detection device in a use case 2.
FIG. 14 is a diagram illustrating a determination result stored in the determination buffer in the use case 2.

A use case 2 shown in FIG. 13 and FIG. 14 is a case in which the posture of the driver is temporarily put in the forward-falling state and then returns to the ordinary posture. The ordinary posture includes a state in which the posture is slightly changed, in addition to the normal posture desired for driving. In this case, when the driver makes a transition to the forward-falling state, the determination result of "in the premonition region" is stored in the determination buffer 76. However, before the ratio of determination results indicating "in the premonition region" exceeds the predetermined ratio P1, the driver recovers from the forward-falling state. Therefore, the determination results "out of the premonition region" are stored in the determination buffer 76 again. As a result, the posture determination unit 74 continues to determine that the state of the driver is the "normal posture" without transition to the "premonition state".

(Use Case 3)

Figure 15:
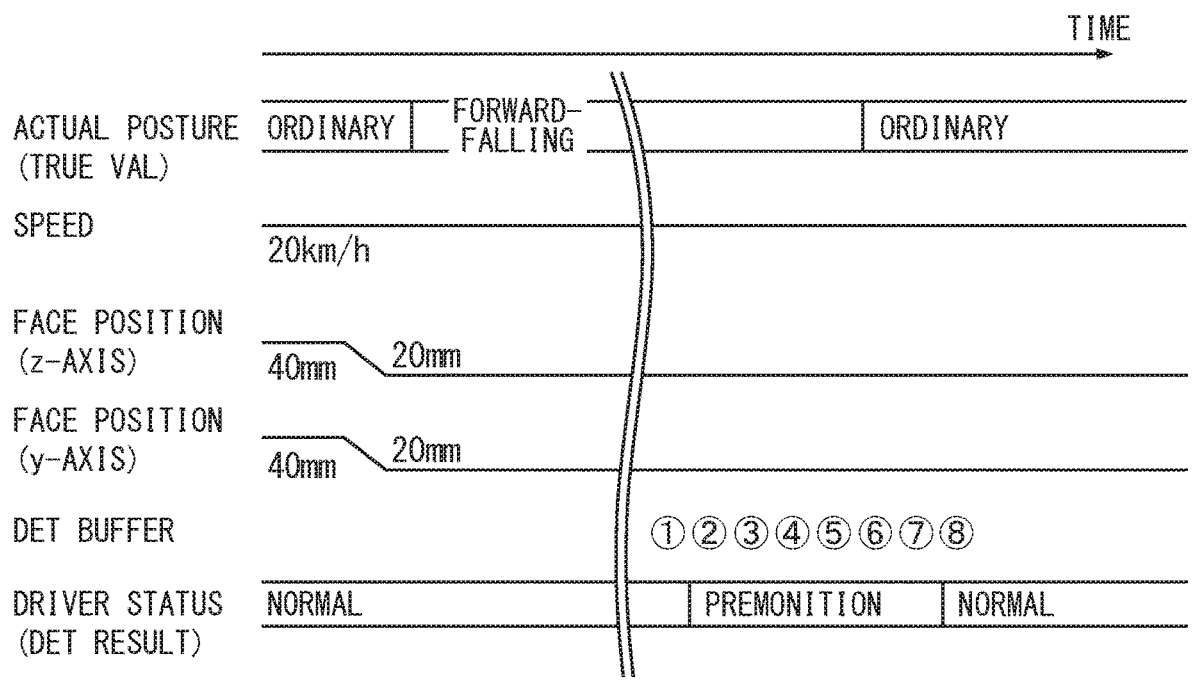
FIG. 15 is a diagram illustrating the operation of the abnormality detection device in a use case 3.
Figure 16:
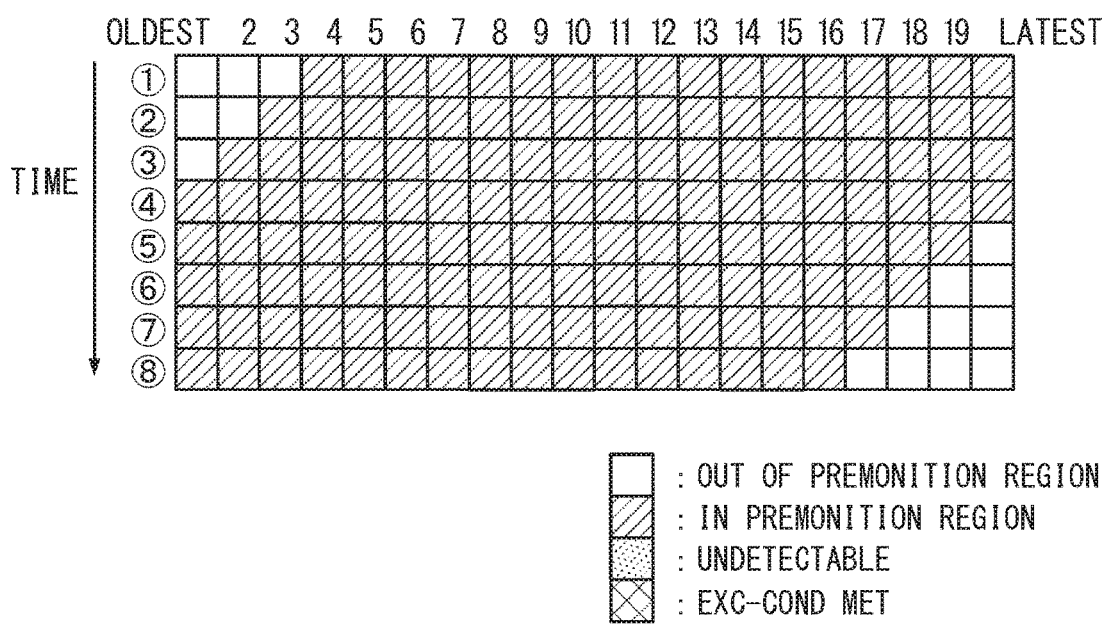
FIG. 16 is a diagram illustrating a determination result stored in the determination buffer in the use case 3.

A use case 3 shown in FIGS. 15 and 16 is a case in which the posture of the driver is put in the forward-falling state (see FIG. 3) for a certain time longer than that of the use case 2, and then returned to the ordinary posture. For example, the driver sneezes or the like. In this case, when the driver makes a transition to the forward-falling state, the determination result of "in the premonition region" is stored in the determination buffer 76. At a timing (time 2) when the ratio of the determination result of "in the premonition region" in the determination buffer 76 exceeds the predetermined ratio P1 due to the continuation of the forward-falling state, the posture determination unit 74 causes the state of the driver to transition from the "normal posture" to the "premonition state".

After the transition to the "premonition state", the driver returns to the ordinary posture. As a result, the determination results "out of the premonition region" are stored in the determination buffer 76 again. At a timing (time 8) when the ratio of the determination results indicating "out of the premonition region" exceeds the predetermined ratio P2, the posture determination unit 74 returns the state of the driver from the "premonition state" to the "normal posture". As described above, if there is a return to the ordinary posture before the elapse of the predetermined time T2, a process for concluding the abnormal posture may not be performed.

(Use Case 4)

Figure 17:
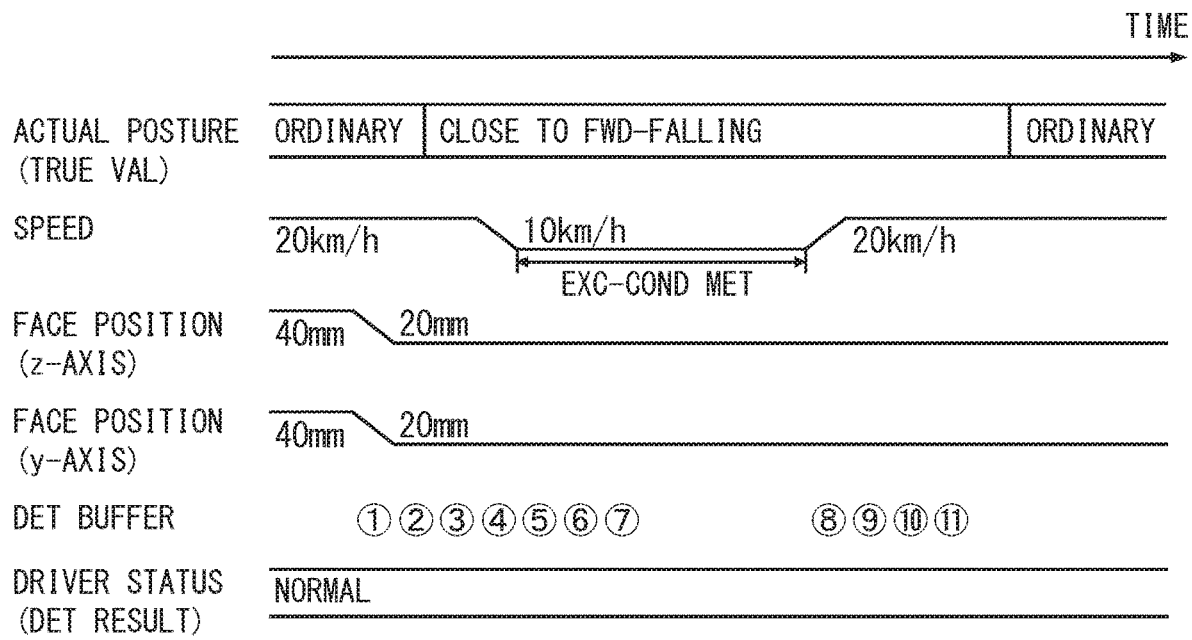
FIG. 17 is a diagram illustrating the operation of the abnormality detection device in a use case 4.
Figure 18:
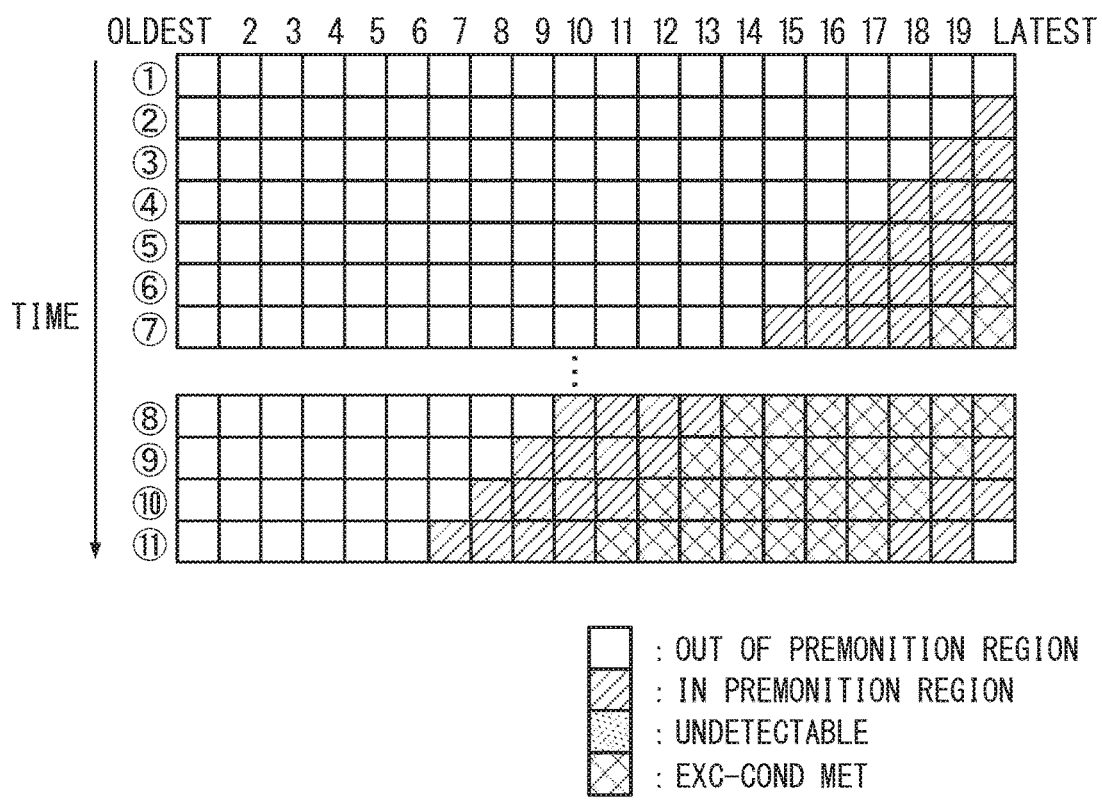
FIG. 18 is a diagram illustrating a determination result stored in the determination buffer in the use case 4.

A use case 4 shown in FIG. 17 and FIG. 18 is a case in which the driver takes a right-turn posture in the case of the right-turn, wherein the right-turn posture is close to the forward-falling state. In this case, because of temporary deceleration for making the right turn for example, it is determined by the traveling state determination unit 72 that the exclusion condition is met. Even if the head Hd of the driver taking the right turn posture is in the premonition region 42a, the posture determination unit 74 does not determine that the head Hd is "in the premonition region" but determines that the head Hd is "under the exclusion condition". In this manner, the determination result of "under the exclusion condition" is consecutively stored in the determination buffer 76. As a result, since the ratio of determination results indicating "in the premonition region" does not exceed the predetermined ratio P1, the posture determination unit 74 continues to determine the state of the driver as "normal posture" without erroneously recognizing the right turn posture as the forward-falling state.

(Use Case 5)

Figure 19:
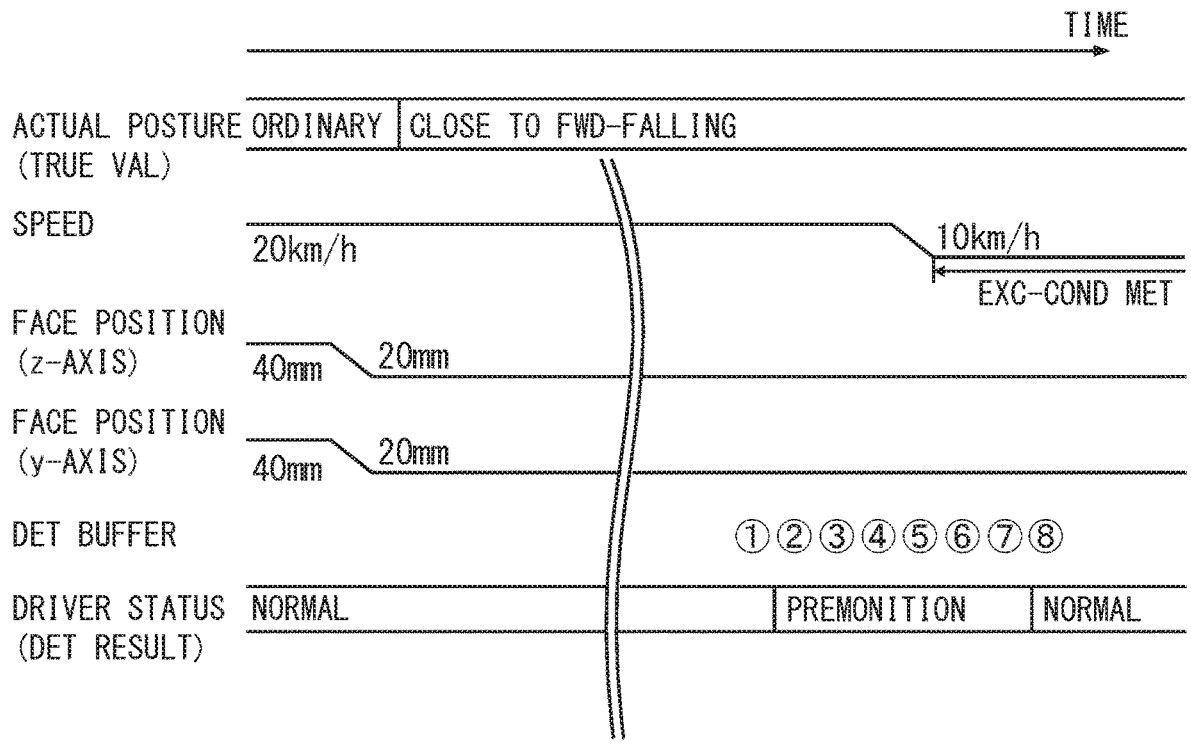
FIG. 19 is a diagram illustrating the operation of the abnormality detection device in a use case 5.
Figure 20:
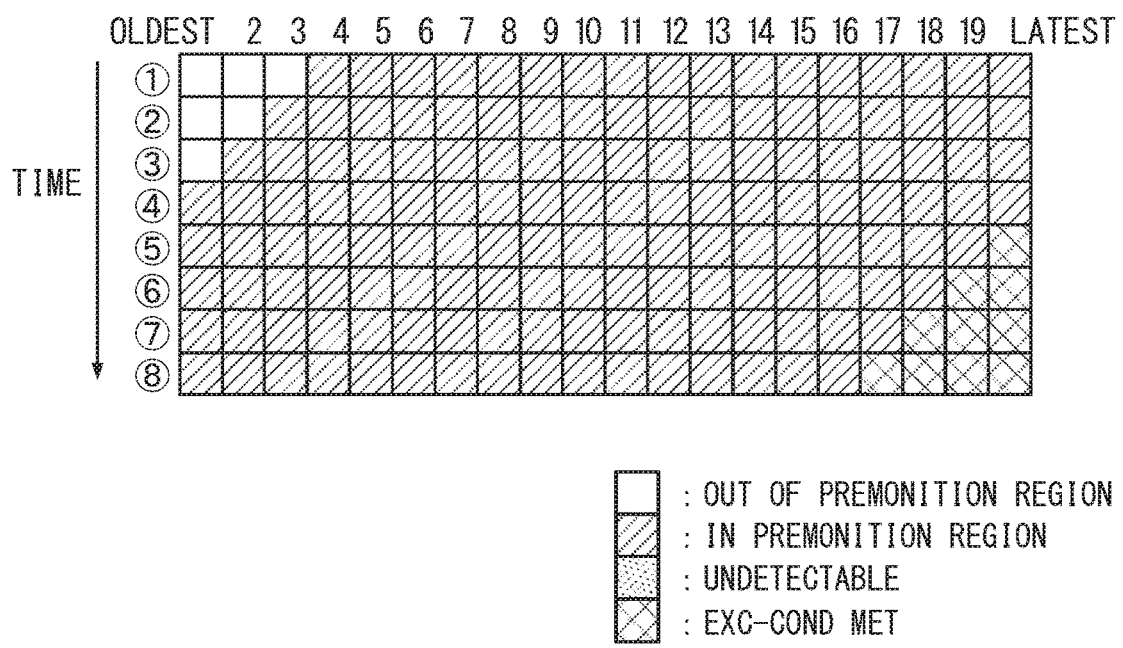
FIG. 20 is a diagram illustrating a determination result stored in the determination buffer in the use case 5.

A use case 5 shown in FIGS. 19 and 20 relates to the right turn scene as is the case of the use case 4. In the use case 5, the driver takes a right turn posture which is close to the forward-falling state. However, the driver of the use case 5 takes the right turn posture in a traveling state in which the exclusion condition is not met. Therefore, the determination buffer 76 stores the determination results "in the premonition region". For that reason, with continuation of the right turn posture, the posture determination unit 74 causes the state of the driver to transition from the "normal posture" to the "premonition state" at a timing (time 2) at which the ratio of determination results "in the premonition region" in the determination buffer 76 exceeds the predetermined ratio P1.

However, since the exclusion condition is met after the transition to the "premonition state", the determination buffer 76 consecutively stores the determination results of "under the exclusion condition" instead of "in the premonition region". As a result, at a timing (time 8) when the ratio of determination results indicating "under exclusion condition" exceeds the predetermined ratio P2, the posture determination unit 74 returns to the "normal posture" the state of the driver from the "premonition state".

As described above, the posture determination unit 74 may erroneously recognize the right turn posture or the like as the forward-falling state, and may execute the transition to the "premonition state". However, after the exclusion condition is met, the posture determination unit 74 can correctly determine that the state of the driver is the "normal posture again". Specifically, a situation in which the posture of the driver is erroneously determined as the "abnormal posture (forward-falling state)" due to the right turn posture or the like is avoided.

(Use Case 6)

Figure 3:
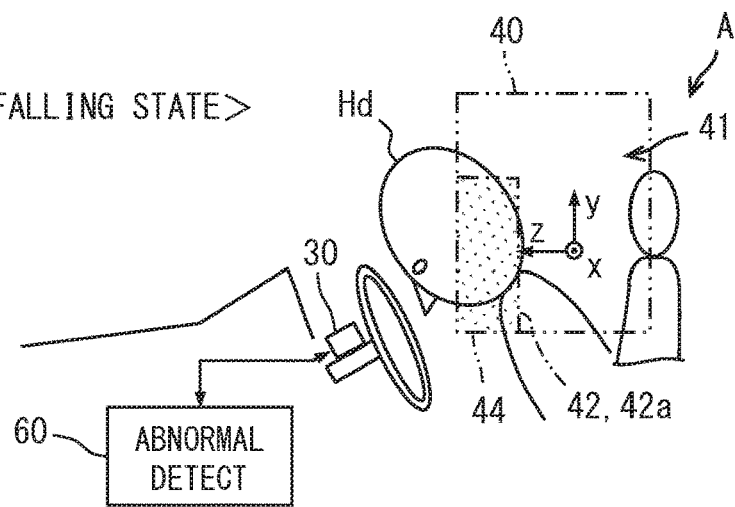
FIG. 3 is a diagram schematically illustrating a forward-falling state, which is one of abnormal postures.
Figure 21:
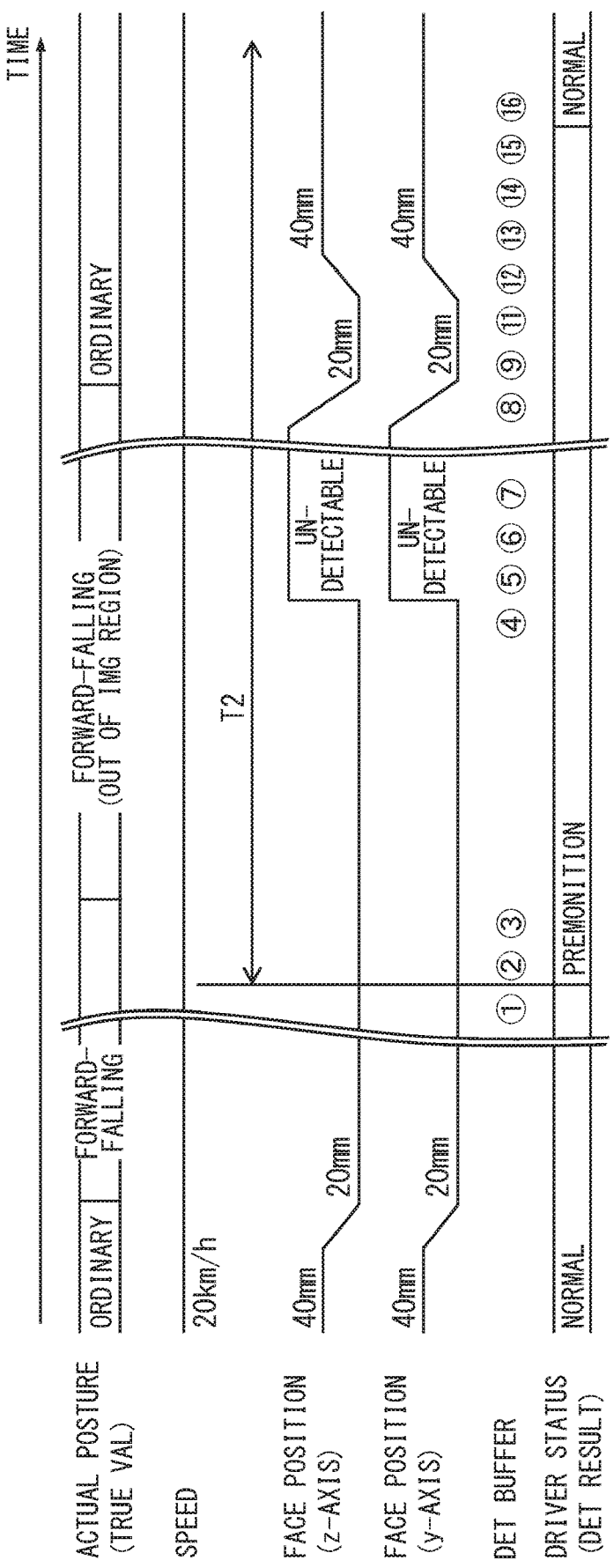
FIG. 21 is a diagram illustrating the operation of the abnormality detection device in a use case 6.
Figure 22:
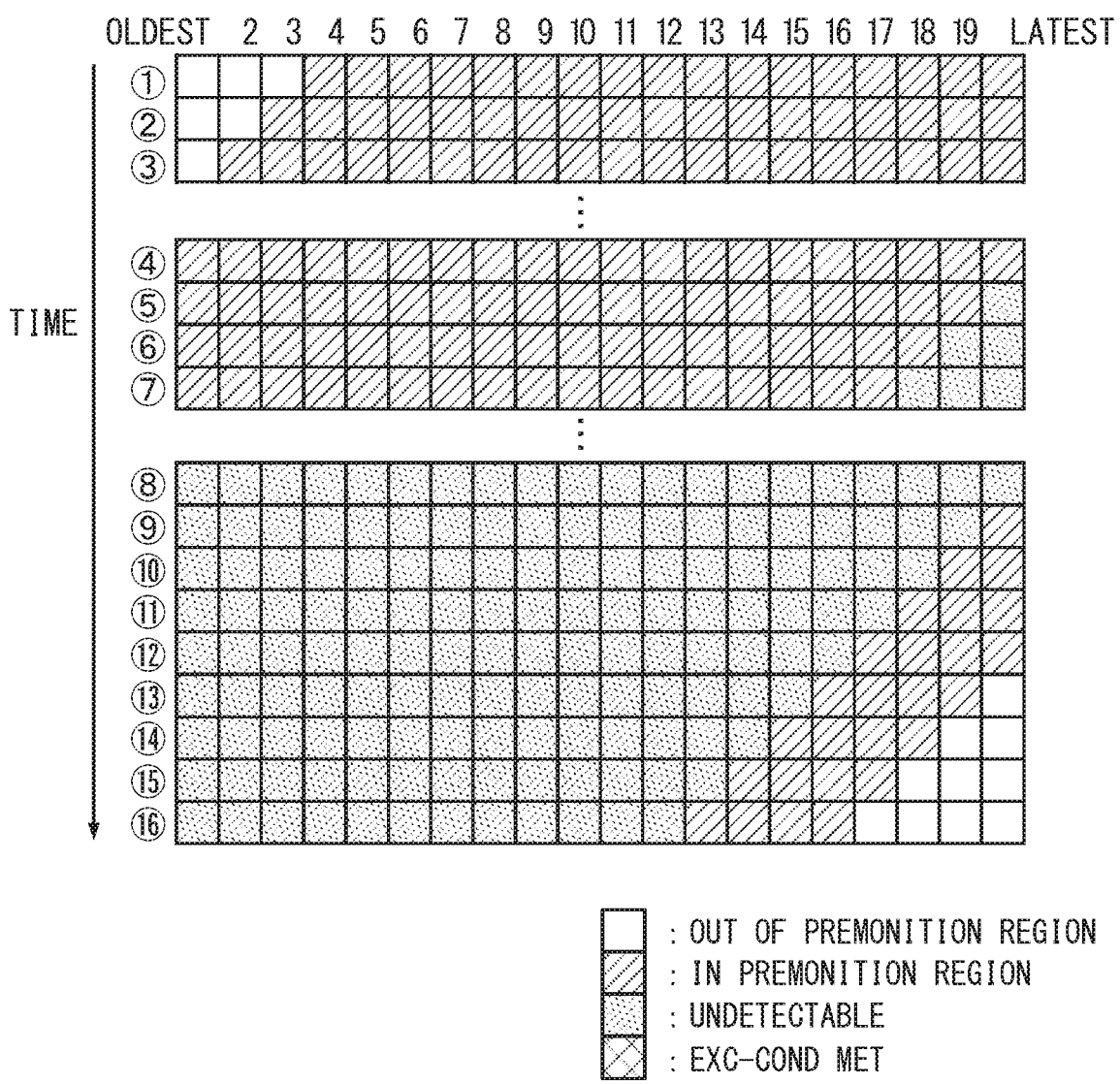
FIG. 22 is a diagram illustrating a determination result stored in the determination buffer in the use case 6.

The driver of a use case 6 shown in FIG. 21 and FIG. 22 falls down into the outside of the imaging region 40 after the driver has been put in the forward-falling state (see FIG. 3). In this case, the determination buffer 76 stores the determination result of "in the premonition region" in response to the state of the driver transitioning to the forward-falling state. Then, at a timing (time 2) when the ratio of determination results "in the premonition region" in the determination buffer 76 exceeds the predetermined ratio P1, the posture determination unit 74 causes the state of the driver to transition from the "normal posture" to the "premonition state".

Further, when the head Hd of the driver falls down and is out of the imaging region 40, the determination result of "undetectable" starts to be stored in the determination buffer 76 (time 5). Even if the determination result "undetectable" is stored, since the total number of "out of the premonition region" and "under the exclusion condition" does not exceed the predetermined ratio P2, the posture determination unit 74 keeps determining the "premonition state", without performing the state transition to the "normal posture".

Then, when the head Hd is returned to the normal region 41 from the outside of the imaging region 40 by the return of the driver to the ordinary posture, the determination result of "out of the premonition region" is stored again in the determination buffer 76 (time 13). If the total number of "out of the premonition region" and "under exclusion condition" exceeds the predetermined ratio P2 after the transition to the "premonition state" and before the elapse of the predetermined time T2, the posture determination unit 74 determines that the state of the driver is the "normal posture" again (time 16).

(Use Case 7)

Figure 23:
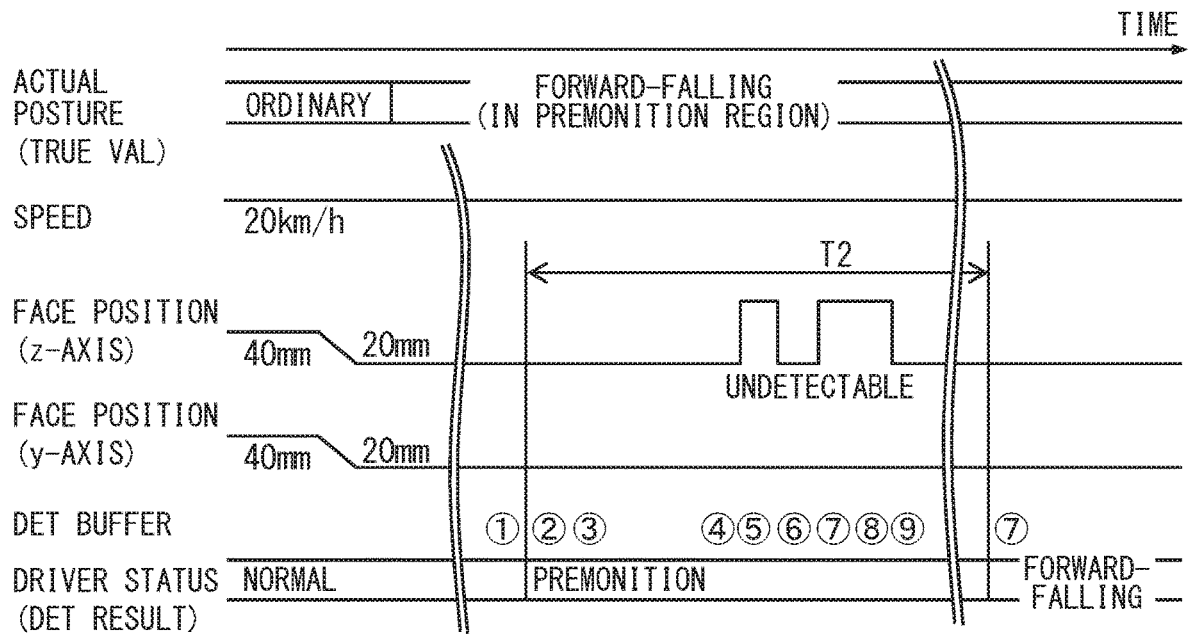
FIG. 23 is a diagram illustrating the operation of the abnormality detection device in a use case 7.
Figure 24:
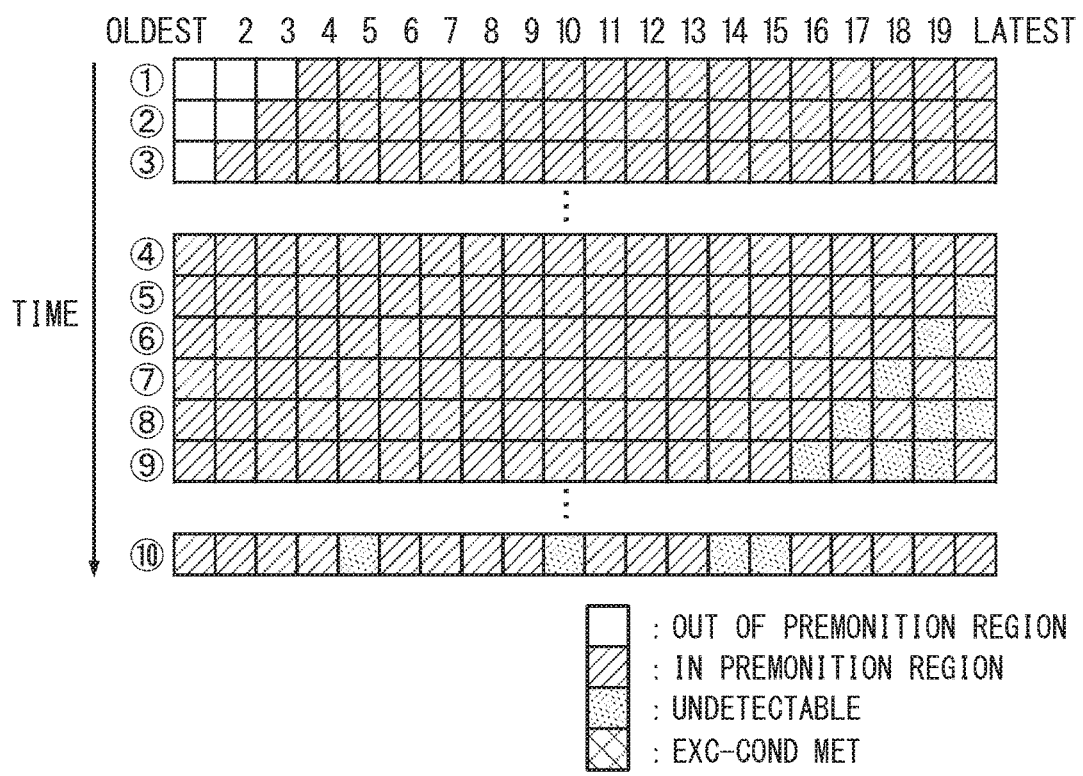
FIG. 24 is a diagram illustrating determination results stored in the determination buffer in the use case 7.

A use case 7 shown in FIG. 23 and FIG. 24 is a case in which the posture of the driver is fixed in the forward-falling state. Even in this case, at the timing (time 2) when the ratio of determination results "in the premonition region" in the determination buffer 76 exceeds the predetermined ratio P1, the posture determination unit 74 causes the state of the driver to transition from the "normal posture" to the "premonition state".

For example, the head Hd of the driver in the forward-falling state may exhibit swing movement in the vicinity of the boundary surface 44 of the imaging region 40 due to traveling vibration of the vehicle A or the like. Therefore, "undetectable" is sporadically stored in the determination buffer 76. However, even if there is such noise, the total number of "out of the premonition region" and "under the exclusion condition" does not exceed the predetermined ratio P2. As a result, the state determination of the "premonition state" is maintained. Then, at a timing (time 10) at which the predetermined time T2 elapses since the transition to the "premonition state", the posture determination unit 74 can determine that the state of the driver is the "forward-falling state".

(Use Case 8)

Figure 25:
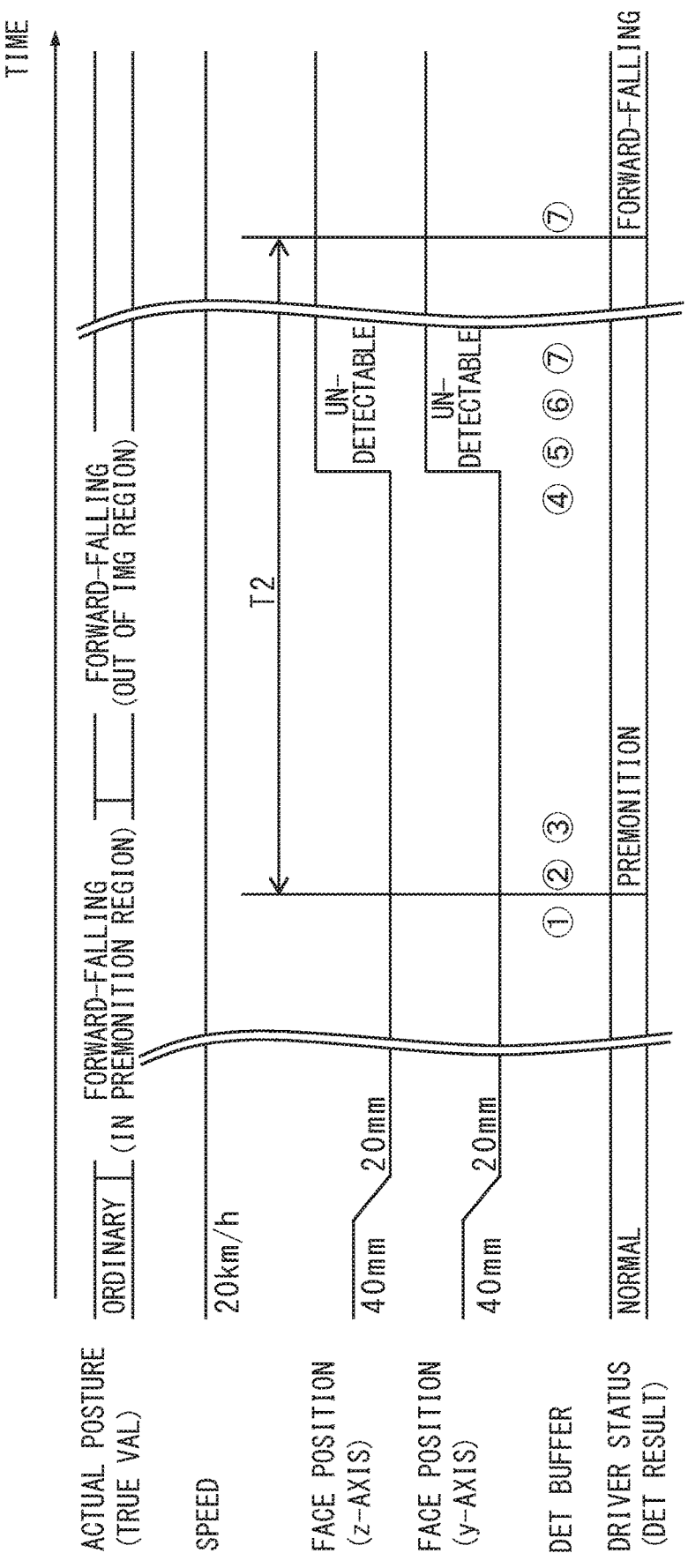
FIG. 25 is a diagram illustrating operation of the abnormality detection device in a use case 8.
Figure 26:
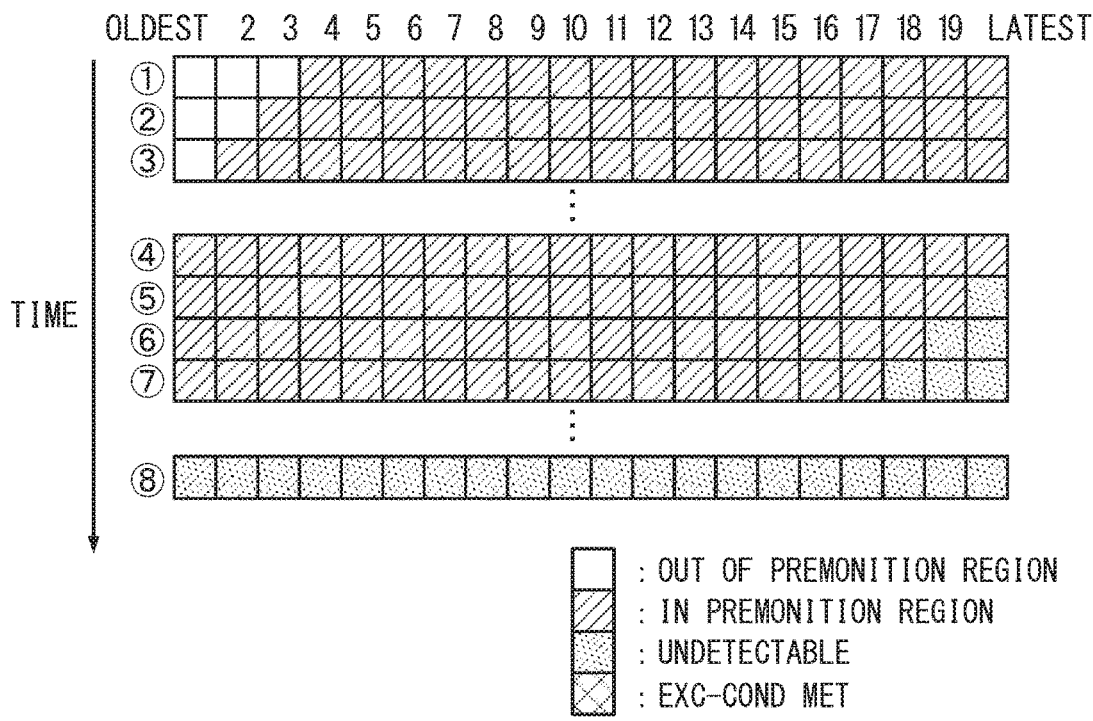
FIG. 26 is a diagram illustrating determination results stored in the determination buffer in the use case 8.

Similarly to the use case 6, the driver in a use case 8 shown in FIGS. 25 and 26 falls down into the outside of the imaging region 40 after the driver was put in the forward-falling state (see FIG. 3). The driver in the use case 8 is kept framed out of the imaging region 40, and does not return to the imaging region 40. In this case also, similarly to the use case 7, the posture determination unit 74 causes the state of the driver to transition from the "normal posture" to the "premonition state" at a timing (see time 2) at which the ratio of determination results "in the premonition region" in the determination buffer 76 exceeds the predetermined ratio P1.

Then, after the head Hd of the driver is framed out of the imaging region 40, when the undetectable information is provided to the driver information acquisition unit 71, the determination result of "undetectable" continues to be stored in the determination buffer 76. Even in this case, since the total number of "out of the premonition region" and "under the exclusion condition" does not exceed the predetermined ratio P2, the state of the driver does not transition to the "normal state" and is maintained at the "premonition state". Thereafter, at the timing (time 8) at which the predetermined time T2 elapses while the total number of "out of the premonition region" and "under the exclusion condition" does not exceed the predetermined ratio P2, the posture determination unit 74 determines that the state of the driver is "in the forward-falling state".

In the present embodiment described so far, the premonition region 42 is defined in a range in which the head Hd of the driver is supposed to be positioned in the process of transitioning from the normal posture to the abnormal posture. When the head Hd stays in the premonition region 42, it is determined that the head Hd is in the abnormal posture. As described above, the posture determination unit 74 can determine the abnormal posture by using not only the information of the vicinity of or outside the boundary surface 44 of the imaging region 40, but also the information of the premonition region 42 defined in the imaging region 40.

It is easier to secure the accuracy of the information in the premonition region 42, as compared with the accuracy of information on the boundary of the imaging region 40, in the immediate vicinity of the boundary, or outside the imaging region used in the prior art for determining posture collapse based on the frame-out of the head Hd from the imaging region 40. More specifically, when the head Hd is about to be framed out of the imaging region 40, the face of the driver in the face image appears only slightly in the vicinity of the boundary of the imaging region 40. When the head Hd is framed out of the imaging region 40, the driver is absent in the face image. Thus, the face image used in the prior art hardly images the face from the front, and the imaging area of the face is hardly ensured. As a result, it is difficult to ensure the information accuracy in the vicinity of the boundary of the imaging region 40 or outside the imaging region 40.

In contract, in cases where the head Hd is positioned in the premonition region 42 defined in a portion part of the imaging region 40, it is possible to image the face from the front in the face image Pi and the imaging area of the face is easily secured. For that reason, the information accuracy of the premonition region 42 is secured more easily, as compared with the information accuracy in the vicinity of the boundary surface 44 immediately before the frame-out and the information accuracy outside the area after the frame-out. For the reason described above, the determination of the abnormal posture using the information of the premonition region 42 can improve the determination accuracy of the posture collapse of the driver.

Suppose that the head Hd of the driver who has entered a dead man state is irregularly swinging, for example, so as to across the boundary surface 44. In this case, a comparative example which tracks a movement trajectory of the head Hd may determine, based on the movement of the head Hd including movement of returning to the normal posture, that the posture is not the abnormal posture. By contrast, in the present embodiment, even if the swinging head Hd repeatedly enters and leaves the premonition region 42, the posture determination unit 74 can determine the stay in the premonition region 42, and thus can determine the abnormal posture, in consideration of an accumulated time in which the head Hd is present in the premonition region 42. Therefore, the determination of the abnormal posture using the stay in the premonition region 42 can extract the posture collapse of the driver with high accuracy, as compared with the determination using the movement trajectory of the head Hd.

The posture determination unit 74 of the present embodiment determines that the driver is in the abnormal posture when the head Hd does not return to the normal region 41 after staying in the premonition region 42. This manner including making a provisional determination of the posture collapse of the driver based on the stay of the head Hd in the premonition region 42 and thereafter making a conclusive determination of the posture collapse based on the continuation of the posture collapse make it possible to further reduce erroneous determination of the abnormal posture.

Further, in the present embodiment, the staying of the head Hd in the premonition region 42 is determined based on both the position and the posture angle of the head Hd. T The use of both the position and the posture angle of the head Hd makes it possible for the posture determination unit 74 to accurately distinguish the abnormality-causing stay of the head Hd in the premonition region 42 from a mere change in the posture of the normal state of the driver. Therefore, the accuracy of the determination of the abnormal posture using the staying in the premonition region 42 can be further improved.

In addition, the premonition region 42 according to the present embodiment is defined to have a predetermined width from the boundary surface 44 of the imaging region 40. With this setting of the premonition region 42, not only the boundary surface 44 which makes it difficult to secure the detection accuracy, but also a range in which the detection accuracy is expected to be secured is included in the premonition region 42. As a result, the accuracy of determining the stay of the head Hd in the premonition region 42 can be more easily ensured.

The imaging region 40 according to the present embodiment is a three-dimensional space so as to include the head Hd. In addition, the premonition region 42 is also a three-dimensional space defined in the imaging region 40. As described above, if the imaging region 40 and the premonition region 42 are both defined in three dimensions, the premonition region 42 can be properly defined at a position where the head Hd of the abnormal posture driver is to be present. As a result, the posture determination unit 74 can accurately detect the driver's posture collapse due to the abnormality.

Further, in the present embodiment, multiple premonition regions 42*a* to 42*e* corresponding to multiple types of abnormal postures are individually defined. When the driver does not return to the normal posture, the posture determination unit 74 determines the abnormal posture of the type that corresponds to the premonition region 42 in which the head Hd stays. When the premonition regions 42 to be passed through in the process of transition to respective abnormal postures are individually set, the posture determination unit 74 can distinguish multiple types of abnormal postures. As a result, non-detection of posture collapse of the abnormal driver can be reduced.

In addition, in the present embodiment, when the exclusion condition relating to the traveling state is satisfied, the posture determination unit 74 does not determine that the head Hd is present in the premonition region 42. With the exclusion condition, the posture determination unit 74 can distinguish the movement of the head Hd due to the posture collapse from the action of the driver for checking the surroundings or the like. Therefore, a situation in which the right turn posture or the like taken in the normal driving operation is erroneously determined as the abnormal posture can be prevented.

The posture determination unit 74 according to the present embodiment determines the stay of the head Hd in the premonition region 42 by using the ratio of determination results stored in the determination buffer 76. With this determination logic, it is possible to reduce an error in the determination of the stay due to influence of noise or the like can be reduced.

In the first embodiment, the normal region 41 corresponds to a "specific region", the boundary surface 44 corresponds to a "boundary", the determination buffer 76 corresponds to a "buffer unit", and the face image Pi corresponds to an "image".

Other Embodiments

Although one embodiment of the present disclosure has been illustrated above, the present disclosure is not construed as being limited to the above embodiment, and is applicable to various embodiments and combinations without departing from the spirit and scope of the present disclosure.

Figure 27:
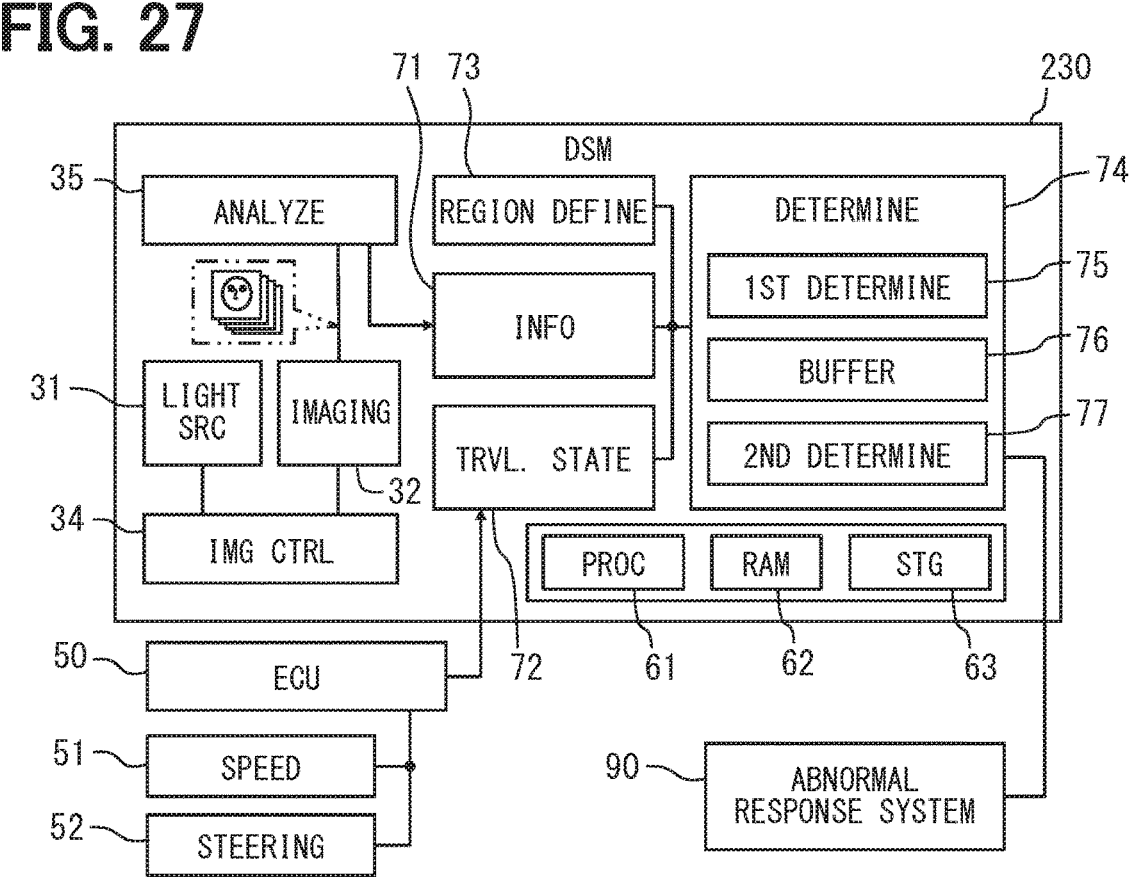
FIG. 27 is a block diagram illustrating an overview of a DSM according to Modification 1.

The status monitor system 10 according to the embodiment described above includes the DSM 30 and the abnormality detection device 60 (see FIG. 2). However, functions of the abnormality detection device according to the present disclosure may be provided in various forms. For example, in Modification 1 of the embodiment shown in FIG. 27, functions of the abnormality detection device are built in the DSM 230. In detail, in Modification 1, the processing unit 61 in the DSM 230 can execute the abnormality detection program stored in the storage unit 63. As a result, the DSM 230 implements functional blocks including an imaging control unit 34, an image analysis unit 35, a driver information acquisition unit 71, a traveling state determination unit 72, a region definition unit 73, and a posture determination unit 74. Modification 1 configured as described above also exhibits the same effects as the above embodiment. In Modification 1, the DSM 230 corresponds to an "abnormality detection device".

Figure 28:
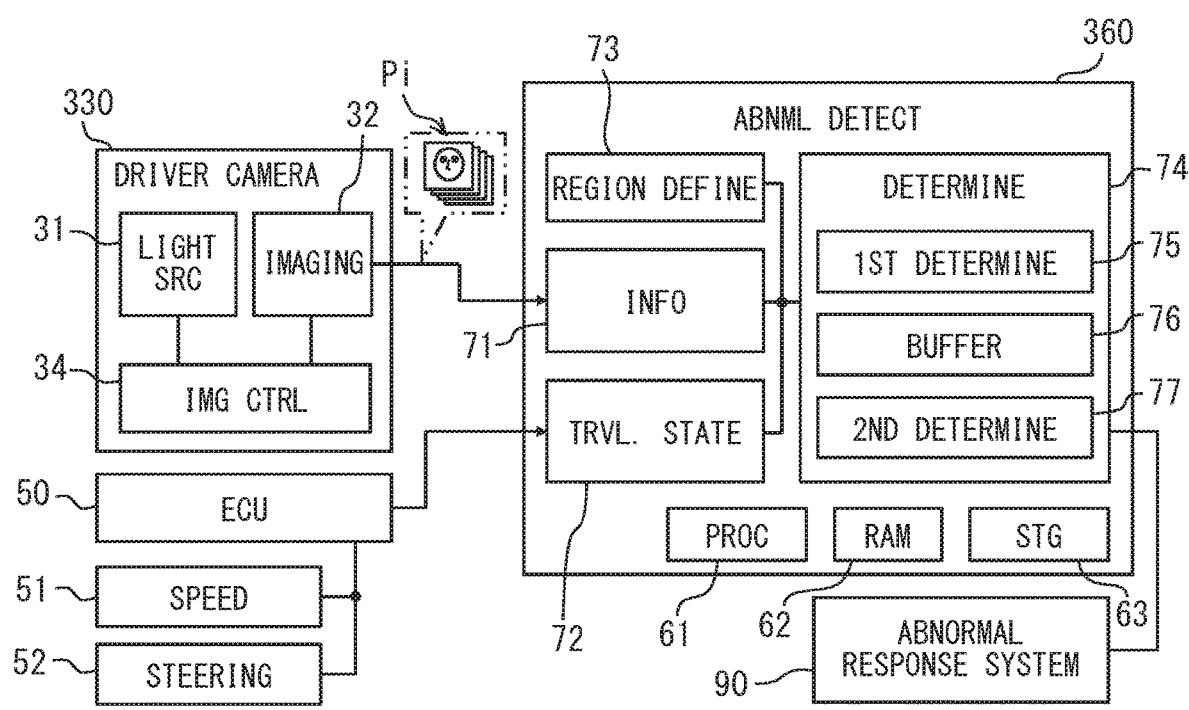
FIG. 28 is a block diagram illustrating an overview of a status monitor system according to Modification 2.

Further, in Modification 2 of the embodiment shown in FIG. 28, an abnormality detection device 360 is connected to a driver camera 330. The driver camera 330 includes a light source unit 31, an imaging unit 32, and an imaging control unit 34, and provides consecutively captured face images Pi to the abnormality detection device 360. The driver information acquisition unit 71 of the abnormality detection device 360 further includes substantially the same image analysis function as the image analysis unit 35 of the above embodiment (see FIG. 2), and can detect the head coordinate position in three dimensions and the posture angle of the head and the like by use of the information extracted from respective face images Pi. In Modification 2 described above, the same effects as those of the above embodiment can be obtained. With the analysis of the face image Pi, information on not only the position of the head Hd and the face orientation but also the line of sight and the degree of opening of the eyes of the driver may be further obtained.

The embodiment described above can improve determination accuracy, without increasing an angle of view toward a wide angle causing an increase in cost of the DSM. However, the angle of view of the imaging unit employed in the DSM may be increased toward the wide angle. In cases where information on the face image of the same angle of view is used, the determination of the abnormal posture using the stay determination of the premonition region can ensure higher determination accuracy than the determination of the abnormal posture without using the stay determination of the premonition region.

Further, the installation position of the DSM may be changed as appropriate. In this regard, when the installation position of the DSM is deviated from the front, the detection accuracy in the vicinity of the boundary surface of the imaging region may be deteriorated. Therefore, the process of determining the abnormal posture by using the stay determination in the premonition region can contribute to determination accuracy improvement in cases where the installation position of the DSM is limited to positions other than the front of the driver.

The imaging region and the premonition region of the above embodiment are both defined in three-dimensional rectangular parallelepiped shapes. However, the three-dimensional shapes of the imaging region and the premonition region may be appropriately changed. A respective boundary surface of the imaging region may be slightly curved, or may be inclined with respect to an xy-plane, a yz-plane, and/or a zx-plane. Further, the boundary surface for determining an entry into the premonition region and the boundary surface for determining a return from the premonition region to the normal region may be different from each other. In other words, the boundary surface for use in the entry determination may be defined at a position closer to the boundary surface of the imaging region than the boundary surface for use in the return determination is. Further, the imaging region and the premonition region may be defined in two dimensions in directions along the face image, for example. The boundary in this case is defined in a one-dimensional line shape.

In the embodiment described above, one premonition region is defined for one abnormal posture. However, multiple premonition regions may be defined for one abnormal posture. Further, the position of the origin in the coordinate information may be appropriately changed. For example, a specific vertex of the imaging region may be set as the origin. In addition, the normal region may be an entire range of the imaging region except the premonition region, or may be part of the range of the imaging region, which range does not overlap with the premonition region.

The values of the predetermined times T1 and T2 and the predetermined ratios P1 and P2 in the embodiment described above can be appropriately changed. The predetermined times T1 and T2 and the predetermined ratios P1 and P2 may be different from one abnormal posture to another abnormal posture. In this regard, it is preferable that the predetermined time T2 be longer than the predetermined time T1. Further, it is preferable that the predetermined ratio P1 be larger than the predetermined ratio P2.

In the embodiment described above, when the determination results of "out of the premonition region" exceed the predetermined ratio P1, the state transition from the "normal posture" to the "premonition state" is performed. However, when the total number of determination results "out of the premonition region" and "under the exclusion condition"

exceeds the predetermined ratio P1, the determination unit may perform the state transition from the "normal posture" to the "premonition state".

In the embodiment described above, the provisional determination using the determination buffer and the conclusive determination using the T2 counter are combined together. However, a counter may be used for the provisional determination of the "premonition state" and a determination buffer may be used for the conclusive determination of the "abnormal posture". Furthermore, both the preliminary determination and the definite determination may be performed using one or more counters. Alternatively, both the preliminary determination and the definite determination may be established by using one or more determination buffers.

In the embodiment described above, a plurality of premonition regions are defined to enable a plurality of abnormal postures to be detected. However, the abnormality detection device may be configured to detect one specific abnormal posture. Further, the abnormality detection device may be capable of detecting an abnormal posture different from the postures illustrated in the above embodiment.

In the embodiment described above, the exclusion condition is set so as not to erroneously detect the right-turn posture or the like as the abnormal posture. Specific contents of such an exclusion condition may be appropriately changed. Further, the setting of the exclusion condition may be omitted.

Various non-transitory tangible storage media such as flash memory and hard disk drive are employable as storage units of the abnormality detection device and the DSM. In addition, the storage medium for storing the abnormality detection program is not limited to a storage medium of a vehicle mounted system, and may be an optical disk, a hard disk drive of a general-purpose computer, or the like serving as an original for copy to the storage medium.

Units for controlling and methods described in the present disclosure may be implemented by a special purpose computer created by configuring a memory and a processor programmed to execute one or more particular functions embodied in computer programs. Alternatively, the control units and methods described in the present disclosure may be implemented by a special purpose computer created by configuring a processor provided by one or more special purpose hardware logic circuits. Alternatively, the control units and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

The flowchart described in the present disclosure or processing of the flowchart includes a plurality of steps (also called sections) and a respective step is represented by, for example, S101. A respective step may be divided into a plurality of sub-steps. A plurality of steps may constitute one step.

Although embodiments, configurations and aspects of the present disclosure have been in illustrated, embodiments, configurations and aspects of the present disclosure are not limited to the above illustrated respective ones. For example, embodiments, configurations and aspects obtained by combining technical portions disclosed in different embodiments, configurations and aspects are also embodiments, configurations and aspects of the present disclosure.

The invention claimed is:

1. An abnormality detection device that detects an abnormal posture of a driver of a vehicle based on information of an image captured by an imaging unit in the vehicle in which an imaging region of the imaging unit is defined to image a head of the driver, the abnormality detection device comprising:
a region definition unit that defines at least one premonition region in a range in which the head is supposed to be positioned in process of transitioning, due to posture collapse of the driver, from a normal posture to the abnormal posture in the imaging region;
a posture determination unit that
determines whether the head is present in the at least one premonition region,
when the head stays in the premonition region, determines that the driver is in a state of the abnormal posture, and
the head of the driver can go outside of the imaging region when the driver is in the state of the abnormal posture; and
a buffer unit for storing in time series a predetermined number of determination results of whether or not the head is presented in the premonition region, wherein
the posture determination unit determines that the head stays in the premonition region when a total number of determination results each indicating that the head is present in the premonition region exceeds a predetermined ratio of the total number of determination results stored in the buffer unit.

2. The abnormality detection device according to claim 1, wherein
when the head is not returned to a specific region included in the imaging region except the premonition region after the head stayed in the premonition region, the posture determination unit determines that the driver is in the state of the abnormal posture.

3. The abnormality detection device according to claim 1, wherein
the posture determination unit determines the stay of the head in the premonition region based on both a position and a posture angle of the head.

4. The abnormality detection device according to claim 1, wherein
the region definition unit defines the premonition region in the range that has a boundary of the imaging region and has a predetermined width from the boundary.

5. The abnormality detection device according to claim 1, wherein
the imaging region is a three-dimensional space defined so as to include the head, and
the region definition unit defines the three-dimensional premonition region in the imaging region.

6. The abnormality detection device according to claim 1, wherein
the region definition unit individually defines a plurality of the premonition regions corresponding to a plurality of types of the abnormal postures, and
when the head stays in one of the plurality of premonition regions, the posture determination unit determines that the driver is in the abnormal posture of the type corresponding to the premonition region in which the head stays.

7. The abnormality detection device according to claim 1, further comprising:

a traveling state determination unit that determines whether or not a traveling state of the vehicle corresponds to a predefined exclusion condition, wherein
when the traveling state determination unit determines that the exclusion condition is met, the posture determination unit does not determine that the head is present in the premonition region.

8. A non-transitory computer readable tangible storage medium storing an abnormality detection program for detecting an abnormal posture of a driver of a vehicle based on information of an image captured by an imaging unit in the vehicle in which an imaging region of the imaging unit is defined to image a head of the driver, the abnormality detection program causing at least one processing unit to perform:
defining at least one premonition region in a range in which the head is supposed to be positioned in process of transitioning, due to posture collapse of the driver, from a normal posture to the abnormal posture in the imaging region;
determining whether the head is present in the at least one premonition region;
in response to the head staying in the premonition region, determining that the driver is in a state of the abnormal posture;
the head of the driver can go outside of the imaging region when the driver is in the state of the abnormal posture;
storing, in a buffer unit, in time series a predetermined number of determination results of whether or not the head is present in the premonition region; and
determining that the head stays in the premonition region when a total number of determination results each indicating that the head is present in the premonition region exceeds a predetermined ration of the total number of determination results stored in the buffer unit.

9. An abnormality detection device that detects an abnormal posture of a driver of a vehicle based on information of an image captured by an imaging unit in the vehicle in which an imaging region of the imaging unit is defined to image a head of the driver, the abnormality detection device comprising:
a region definition unit that defines at least one premonition region in a range in which the head is supposed to be positioned in process of transitioning, due to posture collapse of the driver, from a normal posture to the abnormal posture in the imaging region;
a posture determination unit that
determines whether the head is present in the at least one premonition region,
when the head stays in the at least one premonition region, determines that the driver is in a premonition state, and
when the driver does not return to the normal posture for a predetermined time after it is determined that the driver is in the premonition state, determines that the driver is in a state of the abnormal posture; and
a buffer unit for storing in time series a predetermined number of determination results of whether or not the head is presented in the premonition region, wherein
the posture determination unit determines that the head stays in the premonition region when a total number of determination results each indicating that the head is presented in the premonition region exceeds a predetermined ratio of the total number of determination results stored in the buffer unit.

\* \* \* \* \*